US012591887B2

(12) United States Patent
Shah et al.

(10) Patent No.: US 12,591,887 B2
(45) Date of Patent: Mar. 31, 2026

(54) SYSTEMS AND METHODS FOR ASSESSING TRUSTWORTHINESS OF CUSTOMER ACCOUNTS IN OMNICHANNEL RETAIL TRANSACTIONS USING MACHINE LEARNING

(71) Applicant: Walmart Apollo, LLC, Bentonville, AR (US)

(72) Inventors: Jay Shital Shah, Sunnyvale, CA (US); Sarthak Jagetiya, Bhilwara (IN); Gnanapriya Venkatasubramaniam, San Carlos, CA (US); Mohammad Javad Mahzoon, Fremont, CA (US); Ahmad Khodayari-Rostamabad, San Jose, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 30 days.

(21) Appl. No.: 18/427,715

(22) Filed: Jan. 30, 2024

(65) Prior Publication Data

US 2025/0245655 A1 Jul. 31, 2025

(51) Int. Cl.
*G06Q 20/40* (2012.01)
*G06N 3/02* (2006.01)

(52) U.S. Cl.
CPC .............. *G06Q 20/40* (2013.01); *G06N 3/02* (2013.01)

(58) Field of Classification Search
CPC .................................................... G06Q 20/40
See application file for complete search history.

(56) References Cited

U.S. PATENT DOCUMENTS

| | | | |
|---|---|---|---|
| 8,725,597 B2 | 5/2014 | Mauseth et al. | |
| 9,288,217 B2 | 3/2016 | Kirkham et al. | |
| 10,217,116 B1 * | 2/2019 | Lopez | G06Q 30/06 |
| 10,896,423 B2 | 1/2021 | Anson et al. | |
| 10,924,514 B1 * | 2/2021 | Altman | H04L 29/06 |
| 11,175,145 B2 | 11/2021 | Ghadiok et al. | |

(Continued)

OTHER PUBLICATIONS

Islam, et al., in "AI-Driven Fraud Detection in the U.S. Financial Sector: Enhancing Security and Trust," from International Journal of Machine Learning Research in Cybersecurity and Artificial Intelligence, vol. 14, Issue No. 1, 2023 (Year: 2023).*

(Continued)

*Primary Examiner* — Bruce I Ebersman
*Assistant Examiner* — Brandon M Duck
(74) *Attorney, Agent, or Firm* — Morgan, Lewis & Bockius LLP; Manita Rawat

(57) ABSTRACT

Systems and methods for assessing trustworthiness of customer accounts in retail and e-commerce systems using machine learning are disclosed. In some embodiments, a disclosed method includes: receiving, from a computing device, a trust assessment request regarding a customer account; generating at least one trust-related feature or quantitative attribute associated with the customer based on historical transaction data and relevant account information of the customer; computing, using at least one machine learning model, trust score data of the customer based on the at least one trust-related feature; and transmitting, in response to the trust assessment request, the trust score data of the customer to the computing device.

20 Claims, 15 Drawing Sheets

(56)                  References Cited

U.S. PATENT DOCUMENTS

| | | | |
|---|---|---|---|
| 11,526,675 B2 | 12/2022 | Ghulati | |
| 11,605,090 B2 | 3/2023 | Bhusri et al. | |
| 2011/0238510 A1* | 9/2011 | Rowen | G06Q 26/00 |
| 2016/0277424 A1* | 9/2016 | Mawji | H04L 29/06 |
| 2020/0134660 A1* | 4/2020 | Kadaster | G06Q 30/02 |
| 2021/0374757 A1* | 12/2021 | Bhusri | G06Q 20/40 |
| 2023/0237491 A1 | 7/2023 | Mardikar et al. | |
| 2025/0061459 A1* | 2/2025 | Mardikar | G06Q 20/40 |

OTHER PUBLICATIONS

Dr. Nir Haloani, "Introducing COTI's Global Trust System (GTS), an advanced layer of trust for any blockchain," COTI, Jul. 29, 2019, 16 pages.
https://blog.kera.io/building-autoencoders-in-keras.html (This link reflects to https://www.kera.io/, attached).
Badr, Will; "Auto-Encoder: What Is It? And What Is It Used For? (Part 1)"; Towards Data Science, Apr. 22, 2019; https://towardsdatascience.com/applied-deep-learning-part-3-autoencoders-1c083af4d798 (This link reflects to https://towardsdatascience.com/auto-encoder-what-is-it-and-what-is-it-used-for-part-1-3e5c6f017726/.
The hdbscan Clustering Library; https://hdbscan.readthedocs.io/en.
Amdi, Afshine et al.; "A detailed example of data generators with Keras"; 9 pages; https://stanford.edu/~shervine/blog/keras-how-to-generate-data-on-the-fly.
Dabbura, Imad; "K-means Clustering: Algorithm, Applications, Evaluation Methods, and Drawbacks" Sep. 17, 2018, 25 pages ; https://towardsdatascience.com/understanding-k-means-clustering-in-machine-learning-6a6e67336aa1 (This link reflects to https://towardsdatascience.com/k-means-clustering-algorithm-applications-evaluation-methods-and-drawbacks-aa03e644b48a/).
"Gradient Boosting Machine (GBM)"; 16 pages; https://docs.h20.ai/h2o/latest-stable/h20-docs/data-science/gbm.html.

* cited by examiner

<u>1500</u>

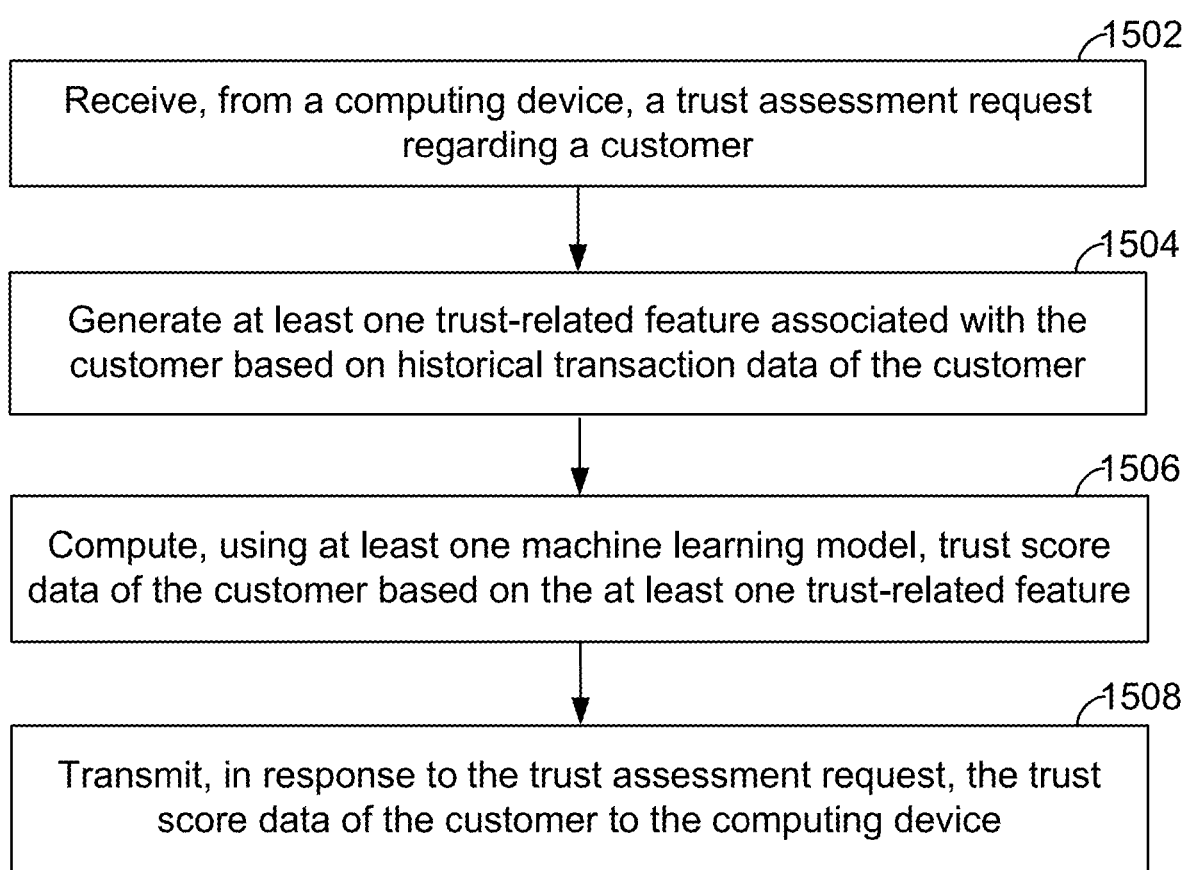

1502

Receive, from a computing device, a trust assessment request regarding a customer

1504

Generate at least one trust-related feature associated with the customer based on historical transaction data of the customer

1506

Compute, using at least one machine learning model, trust score data of the customer based on the at least one trust-related feature

1508

Transmit, in response to the trust assessment request, the trust score data of the customer to the computing device

FIG. 15

SYSTEMS AND METHODS FOR ASSESSING TRUSTWORTHINESS OF CUSTOMER ACCOUNTS IN OMNICHANNEL RETAIL TRANSACTIONS USING MACHINE LEARNING

TECHNICAL FIELD

This application relates generally to machine learning processes and, more particularly, to systems and methods for assessing trustworthiness of customer accounts in omnichannel retail transactions using machine learning.

BACKGROUND

Some transactions, such as some in-store or online retail transactions, are made by fraudulent or abusive customers. In one example, a fraudster may attempt to purchase an item using a payment form, such as a credit card, belonging to another person without permission. In another example, if a fraudster gains access to another customer's account, the fraudster may be able to purchase items on a retailer website using the customer's account and payment forms. Thus, digital account management and online purchase conveniences may facilitate fraudulent retail transactions. In each of these examples, the fraudster is involved in a fraudulent transaction or abusive activity, which may cause time and financial losses of the victimized person, and may also cause financial harm and revenue loss to the retailer or to the e-commerce company. Thus, customers and retailers can benefit from the identification of fraudsters before they perform fraudulent transactions. However, the majority of customer accounts are good ones.

SUMMARY

The embodiments described herein are directed to systems and methods for assessing trustworthiness of customer accounts employing machine learning and using various data available or extracted about the account, the transaction and other related activities and information.

In various embodiments, a system including a non-transitory memory configured to store instructions thereon and at least one processor is disclosed. The at least one processor or digital agent is operatively coupled to the non-transitory memory and configured to read the instructions to: receive, from a computing device, a trust assessment request regarding a customer account; generate at least one related numerical feature or quantitative attribute associated with the customer account based on historical transaction data of the customer accounts and other related information; compute, by using at least one machine learning model, trust score data of the customer account based on the at least one related numerical feature or attribute; and transmit, in response to the trust assessment request, the trust score data of the customer account to the computing device or the calling agent.

In various embodiments, a computer-implemented method is disclosed. The computer-implemented method includes: receiving, from a computing device, a trust assessment request regarding a customer account; generating at least one related numerical feature or quantitative attribute associated with the customer based on historical transaction data of the customer account and other related information; computing, by using at least one machine learning model, trust score data of the customer account based on the at least one related numerical feature or attribute; and transmitting, in response to the trust assessment request, the trust score data of the customer account to the computing device or the calling agent.

In various embodiments, a non-transitory computer readable medium having instructions stored thereon is disclosed. The instructions, when executed by at least one processor, cause at least one device to perform operations including: receiving, from a computing device, a trust assessment request regarding a customer account; generating at least one related numerical feature or quantitative attribute associated with the customer account based on historical transaction data of the customer account and other related information; computing, by using at least one machine learning model, trust score data of the customer based on the at least one related numerical feature or attribute; and transmitting, in response to the trust assessment request, the trust score data of the customer account to the computing device or the calling agent.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein:

FIG. 15 is a flowchart illustrating an exemplary method and process for assessing trustworthiness of a customer account using machine learning, in accordance with some embodiments of the present teaching.

DETAILED DESCRIPTION

Figure 1:
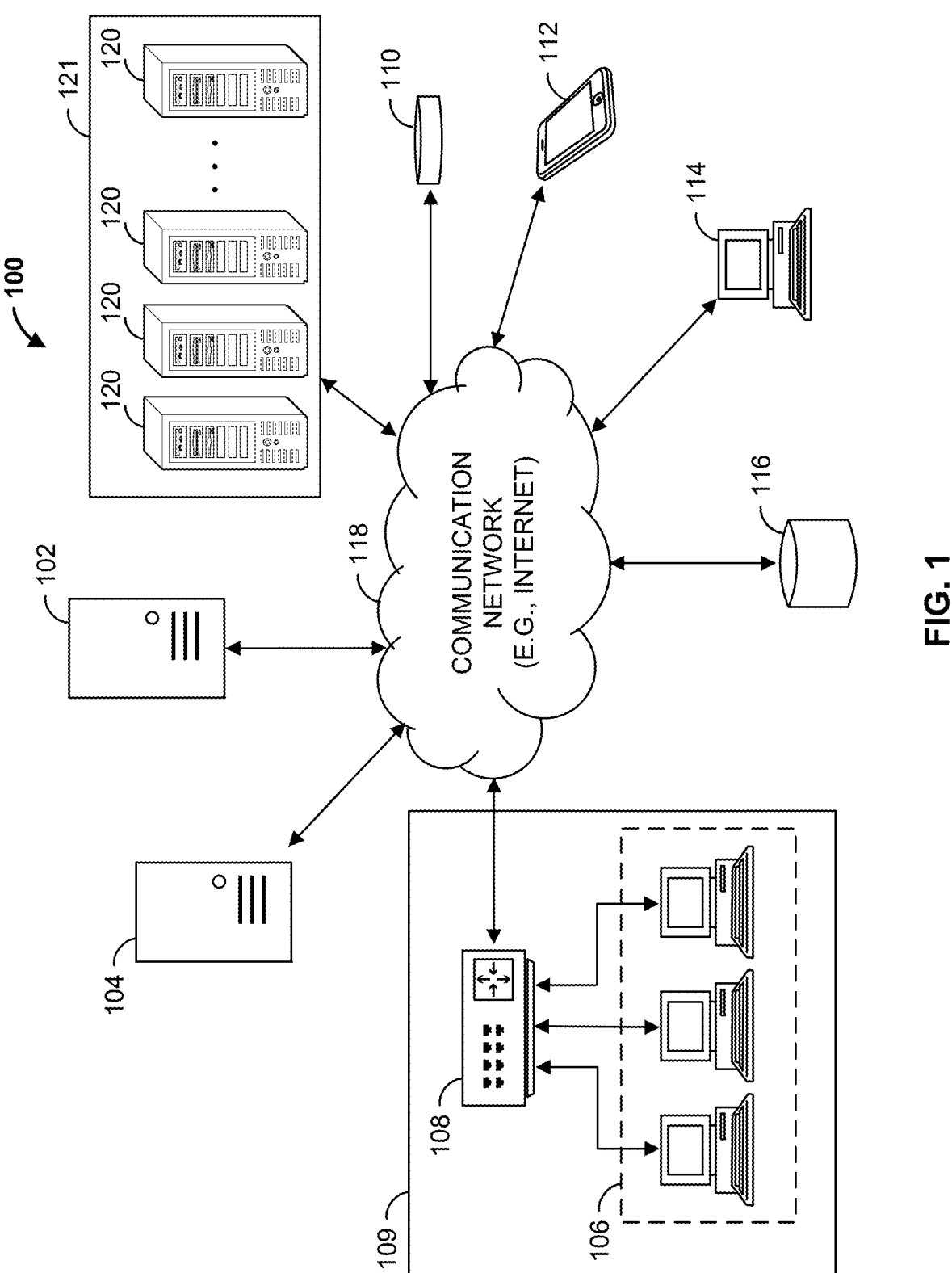
FIG. 1 is a network environment configured for assessing trustworthiness of customer accounts using machine learning, in accordance with some embodiments of the present teaching.

This description of the exemplary embodiments is intended to be read in connection with the accompanying drawings, which are to be considered part of the entire written description. Terms concerning data connections or linkages, coupling and the like, such as "connected" and "interconnected," and/or "in signal communication with" refer to a relationship wherein systems or elements or digital or physical entities are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the systems.

Identifying trustworthy customer accounts helps to improve customer experience for such accounts, beyond other use-cases and benefits. Identifying trustworthy customer accounts is the other side of the coin as opposed to fraud and abuse detection as the majority of customers are established and with good intentions when performing a retail transaction, or an e-commerce activity. There is no single clear definition of trust to understand the trustworthiness of a customer account. For someone, trust can be just defined as absence of negative behavior while for someone else, trust can be not only the absence of negative/abusive behavior but also presence of established good history. In addition, limited data for new customer accounts causes difficulty in gauging trust for a new customer.

The present teaching discloses methods towards defining trust and thereby creating a corresponding target/trust label useful for predictive machine learning, which are then used to identify trustworthy accounts. The term "customer trust score model" in this document or in the accompanying drawings will be used to refer to the whole system, methodology or to the predictive machine learning model and the process to assess and/or generate trustworthiness measures of a customer account.

One objective of the present teaching is to predict the likelihood of a customer account's trustworthiness by leveraging the customer's interactions from multiple omni-channel touchpoints where customer or related entities interacted with various retail and e-commerce system and products, using a predictive model. This will provide a comprehensive or holistic customer trustworthiness score which can be used to reduce customer friction, improve customer experience, enhance customer satisfaction and aid fraud and abuse detection. In addition, the trust score model can aid fraud and abuse detection system through customer account segmentation, alleviate cold start problems and speed up feature/product launches by leveraging customer's interactions from various other touchpoints, and help to build a systematic and adaptive solution to update a customer's trustworthiness over time based on evolving risky/abusive/good behavior.

In some embodiments, a disclosed system aims to assess the trust level and/or trust category among customers based on their overall past interactions and history with various retail channels (physical store, e-commerce platform, payment app, etc.), to provide a one-stop dynamic solution based on a combination of machine learning and deep learning techniques for a holistic assessment of a customer's trustworthiness. This customer trust assessment system is adaptive in nature and determines trustworthiness based on customer's recent established good or bad/fraudulent interaction and transaction history.

In some embodiments, an adaptive holistic trust assessment system is disclosed to utilize a holistic data mart with normalized and standardized data across omni channel touchpoints, to generate numerical features for determining trust scores for customers. Versatile deep learning powered predictive models are used by the system based on holistic data including fraud, abuse and trust behaviors. In addition, the system can use sophisticated rules to pre-label millions of omni-channel customer transaction records, as trusted, non-trusted or indeterminate category for training and building a machine learning model. The system can utilize a trained artificial neural network to augment some indeterminate labels to either trusted labels or non-trusted labels based on customer clustering. The training data with augmented labels will be used to train and select an artificial intelligence (AI) or machine learning model for generating customer trust scores based on a multitude of relevant numerical features or quantitative attributes. The adaptive AI or machine learning solution can address cold start problem within a specific new retail channel or product by harnessing information from other retail channels or products.

The holistic data mart is a flexible and expandable framework to standardize and consolidate data from multiple omni-channel products and retail systems. Defining trust and building trust related target label is a difficult and complex process especially due to lack of any direct 'trust' signals or feedbacks. The disclosed systematic method can predict a trust label for a customer account at any retail channel, product or system. The holistic customer trust assessment can benefit fraud/risk assessment systems and provide optimized customer experience based on their trust scores and or trust category.

Trust score can aid faster and safe checkout at stores as well as in online or digital shopping platforms and systems. Trust score of a customer account can be leveraged during peak transaction traffic volume to potentially run lighter fraud checks and hence ease computational load in an adaptive way or in an on-demand basis. Therefore, the disclosed system can benefit both the customers and the online shopping systems, e-commerce and financial transaction processing companies and organizations.

In addition, the system can help to prioritize customers during high-demand sale events according to their trust scores. The system can also provide customer segmentation for efficient real time fraud detection, and aid fraud and abuse detection for store and e-commerce transactions. For example, a trust score of a customer can be used as an input signal to fraud detection model to improve overall fraud detection performance.

Furthermore, in the following, various embodiments are described with respect to systems and methods for assessing trustworthiness of customer accounts using machine learning methods and computational models are disclosed. In some embodiments, a disclosed method includes: receiving, from a computing device or calling agent, a trust assessment request regarding a customer account; generating at least one related numerical feature or quantitative attribute associated with the customer based on historical transaction data of the customer; computing, using at least one machine learning model, trust score data of the customer account based on the at least one related numerical feature; and transmitting, in response to the trust assessment request, the trust score data of the customer account to the computing device or the calling agent.

Turning to the drawings, FIG. 1 is a network environment 100 configured for assessing trustworthiness of customers using machine learning, in accordance with some embodiments of the present teaching. The network environment 100 includes a plurality of devices or systems configured to communicate over one or more network channels, illustrated as a network cloud 118. For example, in various embodiments, the network environment 100 can include, but not limited to, a customer trust computing device 102, a server 104 (e.g., a web server or an application server), a cloud-based engine 121 including one or more processing devices 120, a database or data bank 116, and one or more user computing devices 110, 112, 114 operatively coupled over the network 118. The customer trust computing device 102, the server 104, the workstation(s) 106, the processing device(s) 120, and the multiple user computing devices 110, 112, 114 can each be any suitable data processing and/or computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over the communication network 118.

In some examples, each of the customer trust computing device 102 and the processing device(s) 120 can be a computer, a workstation, a laptop, a server such as a cloud-based server, a mobile device, an edge-processing device, or any other suitable device. In some examples, each of the processing devices 120 is a server that includes one or more processing units, such as one or more graphical processing units (GPUs), one or more central processing units (CPUs), and/or one or more processing cores. Each processing device 120 may, in some examples, execute one or more virtual machines. In some examples, processing resources (e.g., capabilities) of the one or more processing devices 120 are offered as a cloud-based service (e.g., cloud computing) and/or as an edge-computing service. For example, the cloud-based engine 121 may offer computing and storage resources of the one or more processing devices 120 to the customer trust computing device 102.

In some examples, each of the multiple user computing devices 110, 112, 114 can be a cellular phone, a smart phone, a tablet, a personal assistant device, a voice assistant device, a digital assistant, a laptop, a computer, a laser-based code scanner, a mobile smart device, or any other suitable device. In some examples, the server 104 hosts one or more retailer websites or e-commerce platforms. In some examples, the customer trust computing device 102, the processing devices 120, and/or the server 104 are operated by a retailer or an e-commerce company, and the multiple user computing devices 110, 112, 114 are operated by customers, service providers, and/or advertisers associated with the retailer websites. In some examples, the processing devices 120 are operated by a third party (e.g., a cloud-computing provider, or a telecommunication service provider).

The workstation(s) 106 are operably coupled to the communication network 118 via a router (or switch) 108. The workstation(s) 106 and/or the router 108 may be located at a store 109 of a retailer, for example. The workstation(s) 106 can communicate with the customer trust computing device 102 over the communication network 118. The workstation(s) 106 may send data to, and receive data from, the customer trust computing device 102. For example, the workstation(s) 106 may transmit data identifying items purchased by a customer at the store 109 to the customer trust computing device 102.

Although FIG. 1 illustrates three user computing devices 110, 112, 114, the network environment 100 can include any number of user computing devices 110, 112, 114. Similarly, the network environment 100 can include any number of the customer trust computing devices 102, the processing devices 120, the servers 104, and the databases 116.

The communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable data or information network. The communication network 118 can provide access to, for example, the Internet.

In some embodiments, each of the first user computing device 110, the second user computing device 112, and the Nth user computing device 114 may communicate with the server 104 over the communication network 118. For example, each of the multiple user computing devices 110, 112, 114 may be operable to view, access, and interact with a website, such as a retailer's website, hosted by the server 104. The server 104 may capture user session data related to a customer's activity (e.g., interactions) on the website.

In some examples, a customer may operate one of the user computing devices 110, 112, 114 to initiate a web browser that is directed to the website hosted by the server 104. In another example, a customer may operate and use a mobile app or application, API or a utility operating in a computer or in a mobile device or another form of digital or smart device or system, which allows customer to perform retail transaction or an e-commerce activity such as online shopping. The customer may, via the web browser or application, view item advertisements for items displayed on the website, and may click on item advertisements, for example. The website may capture these activities as user session data, and transmit the user session data to the customer trust computing device 102 over the communication network 118. The website may also allow the operator to add one or more of the items to an online shopping cart, and allow the customer to perform a "checkout" of the shopping cart to purchase the items. In some examples, the server 104 transmits purchase data identifying items the customer has purchased from the website to the customer trust computing device 102.

In some examples, a customer may go to a store, e.g. the store 109 for purchasing items. The customer may use some payment method, e.g. a credit card or a payment app, at the store 109 to purchase one or more items. The edge-computing device(s) or workstation(s) 106 in the store 109 may capture these activities as in-store purchase data, and transmit the in-store purchase data to the customer trust computing device 102 over the communication network 118.

In some examples, the customer trust computing device 102 may receive a trust assessment request regarding a customer account from either the server 104 or the store 109. The trust assessment request may be sent standalone or together with trust related data associated with the customer account. In some examples, the trust assessment request may carry or indicate trust related data of the customer account in a past time period. The trust related data may include data about transactions, payment methods and/or emails of the customer in the past time period. In response, the customer trust computing device 102 generates trust score data for the customer. The trust score data may include trust scores and/or a trust status or trust category for the customer account.

In some examples, the customer trust computing device 102 may execute one or more models (e.g., computing programs or quantitative algorithms), such as a machine learning model, deep learning model, statistical model, data processing algorithm, etc., to generate trust score data for a customer account. The customer trust computing device 102 may generate and transmit the trust score data of the customer to the server 104 or the store 109 over the communication network 118, and the server 104 or the store 109 may determine whether to proceed on a transaction with the customer, or whether to run some fraud check or other use cases and treatments with the customer.

In some embodiments, the customer trust computing device 102 is further operable to communicate with the database 116 over the communication network 118. For example, the customer trust computing device 102 can store data to, and read data from, the database 116. The database 116 can be a remote storage device, such as a cloud-based server, a disk (e.g., a hard disk), a memory device on another application server, a networked computer, or any other suitable remote storage. Although shown remote to the customer trust computing device 102, in some examples, the database 116 can be a local storage device, such as a hard drive, a non-volatile memory, or a USB stick. The customer trust computing device 102 may store online purchase data received from the server 104 in the database 116. The customer trust computing device 102 may receive in-store purchase or transaction data from different stores 109 and record them in the database 116. The customer trust computing device 102 may also receive from the server 104 user session data identifying events associated with browsing sessions, and may store the user session data in the database 116. The customer trust computing device 102 may also compute customer trust data in response to a trust assessment request received from the server 104, and may store the customer trust data in the database 116.

In some examples, the customer trust computing device 102 generates and/or updates different computational models or algorithms for assessing trustworthiness of customer accounts. The models, when executed by the customer trust computing device 102, allow the customer trust computing device 102 to compute trust scores indicating probabilities for a customer to have different trust statuses, and generate trust score data based on the trust scores.

In some examples, the customer trust computing device 102 assigns the models (or parts thereof) for execution to one or more processing devices 120. For example, each model may be assigned to a virtual machine hosted by a processing device 120. The virtual machine may cause the models or parts thereof to execute on one or more processing units such as GPUs. In some examples, the virtual machines assign each model (or part thereof) among a plurality of processing units. Based on the output of the models, the customer trust computing device 102 may generate customer trust score data.

Figure 2:
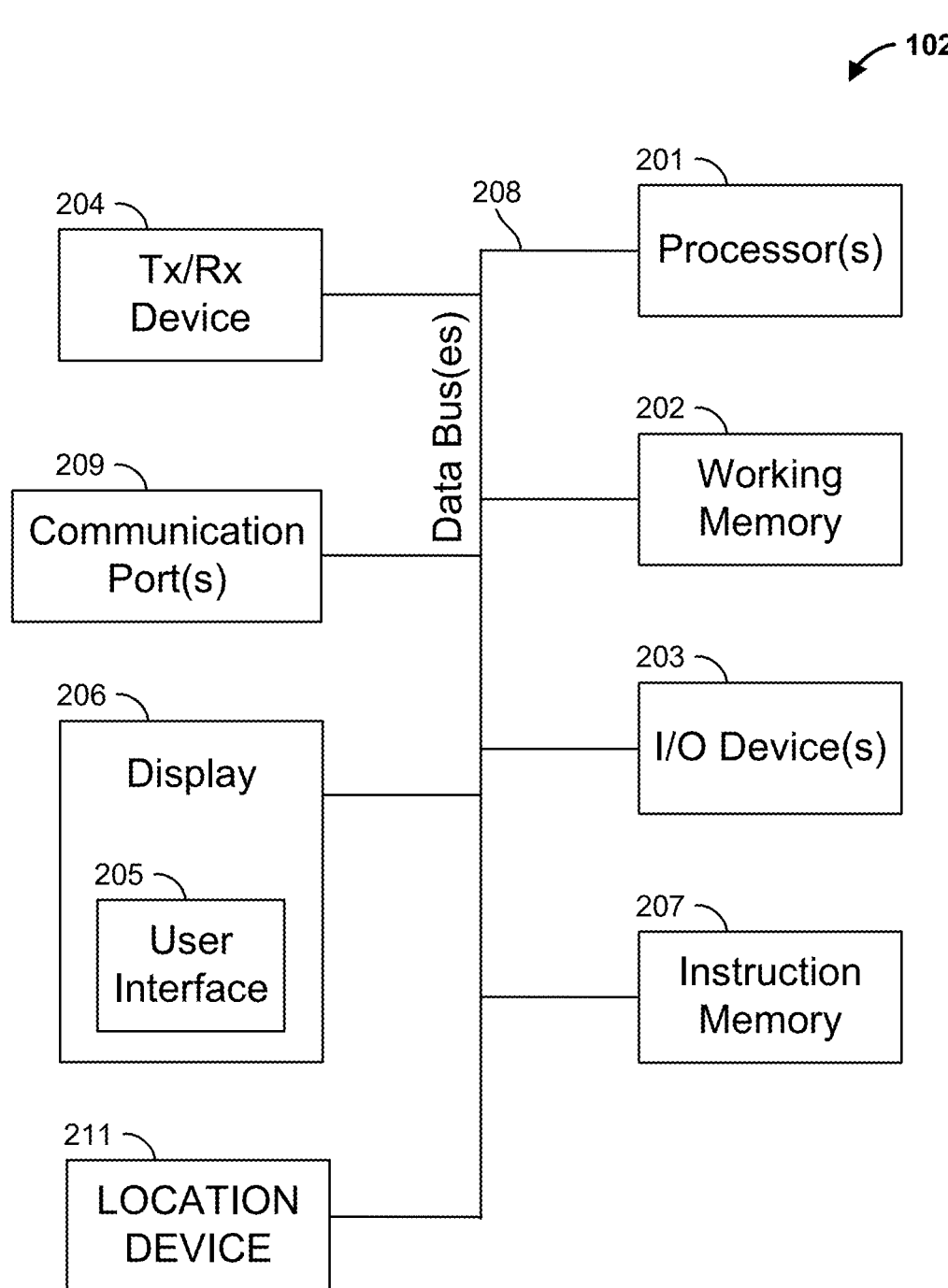
FIG. 2 is a block diagram of a customer account trust computing device, in accordance with some embodiments of the present teaching.

FIG. 2 illustrates a block diagram of a customer trust computing device, e.g. the customer trust computing device 102 of FIG. 1, in accordance with some embodiments of the present teaching. In some embodiments, each of the customer trust computing device 102, the server 104, the multiple user computing devices 110, 112, 114, and the one or more processing devices 120 in FIG. 1 may include the quantitative features shown in FIG. 2. Although FIG. 2 is described with respect to certain components shown therein, it will be appreciated that the elements of the customer trust computing device 102 can be combined, omitted, and/or replicated. In addition, it will be appreciated that additional elements other than those illustrated in FIG. 2 can be added to the customer trust computing device 102.

As shown in FIG. 2, the customer trust computing device 102 can include one or more processors 201, an instruction memory 207, a working memory 202, one or more input/output devices 203, one or more communication ports 209, a transceiver 204, a display 206 with a user interface 205, and an optional location device 211, all operatively coupled to one or more data buses or data communication systems 208. The data buses 208 allow for communication among the various components. The data buses 208 can include wired, or wireless, communication channels.

The one or more processors 201 can include any processing circuitry operable to control operations of the customer trust computing device 102. In some embodiments, the one or more processors 201 include one or more distinct processors, each having one or more cores (e.g., processing circuits). Each of the distinct processors can have the same or different structure. The one or more processors 201 can include one or more central processing units (CPUs), one or more graphics processing units (GPUs), application specific integrated circuits (ASICs), digital signal processors (DSPs), a chip multiprocessor (CMP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The one or more processors 201 may also be implemented by a controller, a microcontroller, an application specific integrated circuit (ASIC), a field programmable gate array (FPGA), a programmable logic device (PLD), etc.

In some embodiments, the one or more processors 201 are configured to implement an operating system (OS) and/or various applications. Examples of an OS include, for example, operating systems generally known under various trade names such as Apple macOS™, Microsoft Windows™, Android™, Linux™, and/or any other proprietary or open-source OS. Examples of applications include, for example, network applications, local applications, data input/output applications, user interaction applications, etc.

The instruction memory 207 can store instructions that can be accessed (e.g., read) and executed by at least one of the one or more processors 201. For example, the instruction memory 207 can be a non-transitory, computer-readable storage medium such as a read-only memory (ROM), an electrically erasable programmable read-only memory (EE-PROM), flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. The one or more processors 201 can be configured to perform a certain function or operation by executing code, stored on the instruction memory 207, embodying the function or operation. For example, the one or more processors 201 can be configured to execute code stored in the instruction memory 207 to perform one or more of any function, method, or operation disclosed herein.

Additionally, the one or more processors 201 can store data to, and read data from, the working memory 202. For example, the one or more processors 201 can store a working set of instructions to the working memory 202, such as instructions loaded from the instruction memory 207. The one or more processors 201 can also use the working memory 202 to store dynamic data created during one or more operations. The working memory 202 can include, for example, random access memory (RAM) such as a static random access memory (SRAM) or dynamic random access memory (DRAM), Double-Data-Rate DRAM (DDR-RAM), synchronous DRAM (SDRAM), an EEPROM, flash memory (e.g. NOR and/or NAND flash memory), content addressable memory (CAM), polymer memory (e.g., ferro-electric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. Although embodiments are illustrated herein including separate instruction memory 207 and working memory 202, it will be appreciated that the customer trust computing device 102 can include a single memory unit configured to operate as both instruction memory and working memory. Further, although embodiments are discussed herein including non-volatile memory, it will be appreciated that the customer trust computing device 102 can include volatile memory components in addition to at least one non-volatile memory component.

In some embodiments, the instruction memory 207 and/or the working memory 202 includes an instruction set, in the form of a file for executing various methods or computational algorithms or processes, e.g. any method as described herein. The instruction set can be stored in any acceptable form of machine-readable instructions, including source code or various appropriate programming languages. Some examples of programming languages that can be used to store the instruction set include, but are not limited to: Java, JavaScript, C, C++, C#, Python, Objective-C, Visual Basic, .NET, HTML, CSS, SQL, NoSQL, Rust, Perl, etc. In some embodiments a compiler or interpreter is configured to convert the instruction set into machine executable code for execution by the one or more processors 201.

The input-output devices 203 can include any suitable device that allows for data input or output. For example, the input-output devices 203 can include one or more of a keyboard, a touchpad, a mouse, a stylus, a touchscreen, a physical button, a speaker, a microphone, a keypad, a click wheel, a motion sensor, a camera, and/or any other suitable input or output device.

The transceiver 204 and/or the communication port(s) 209 allow for communication with a network, such as the communication network 118 of FIG. 1. For example, if the communication network 118 of FIG. 1 is a cellular network, the transceiver 204 is configured to allow communications with the cellular network. In some embodiments, the transceiver 204 is selected based on the type of the communication network 118 the customer trust computing device 102 will be operating in. The one or more processors 201 are operable to receive data from, or send data to, a network, such as the communication network 118 of FIG. 1, via transceiver 204.

The communication port(s) 209 may include any suitable hardware, software, and/or combination of hardware and software that is capable of coupling the customer trust computing device 102 to one or more networks and/or additional devices. The communication port(s) 209 can be arranged to operate with any suitable technique for controlling information signals or data using a desired set of communications protocols, services, or operating procedures. The communication port(s) 209 can include the appropriate physical connectors to connect with a corresponding communications medium, whether wired or wireless, for example, a serial port such as a universal asynchronous receiver/transmitter (UART) connection, a Universal Serial Bus (USB) connection, or any other suitable communication port or connection. In some embodiments, the communication port(s) 209 allows for the programming of executable instructions in the instruction memory 207. In some embodiments, the communication port(s) 209 allow for the transfer (e.g., uploading or downloading) of data, such as machine learning model training data.

In some embodiments, the communication port(s) 209 are configured to couple the customer trust computing device 102 to a communication network. The network can include local area networks (LAN) as well as wide area networks (WAN) including without limitation Internet, wired channels, wireless channels, communication devices including telephones, computers, wire, radio, optical and/or other electromagnetic channels, and combinations thereof, including other devices and/or components capable of/associated with communicating data. For example, the communication environments can include in-body communications, various devices, and various modes of communications such as wireless communications, wired communications, and combinations of the same.

In some embodiments, the transceiver 204 and/or the communication port(s) 209 are configured to utilize one or more communication protocols. Examples of wired protocols can include, but are not limited to, Universal Serial Bus (USB) communication, RS-232, RS-422, RS-423, RS-485 serial protocols, FireWire, Ethernet, Fiber Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, etc. Examples of wireless protocols can include, but are not limited to, the Institute of Electrical and Electronics Engineers (IEEE) 802.xx series of protocols, such as IEEE 802.11a/b/g/n/ac/ag/ax/be, IEEE 802.16, IEEE 802.20, GSM cellular radiotelephone system protocols with GPRS, CDMA cellular radiotelephone communication systems with 1×RTT, EDGE systems, EV-DO systems, EV-DV systems, HSDPA systems, Wi-Fi Legacy, Wi-Fi 1/2/3/4/5/6/6E, wireless personal area network (PAN) protocols, Bluetooth Specification versions 5.0, 6, 7, legacy Bluetooth protocols, passive or active radio-frequency identification (RFID) protocols, Ultra-Wide Band (UWB), Digital Office (DO), Digital Home, Trusted Platform Module (TPM), ZigBee, etc.

The display 206 can be any suitable display, and may display the user interface 205. For example, the user interfaces 205 can enable user interaction with the customer trust computing device 102 and/or the server 104. For example, the user interface 205 can be a user interface for an application of a network environment operator that allows a customer to view and interact with the operator's website. In some embodiments, a user can interact with the user interface 205 by engaging the input-output devices 203. In some embodiments, the display 206 can be a touchscreen, where the user interface 205 is displayed on the touchscreen.

The display 206 can include a screen such as, for example, a Liquid Crystal Display (LCD) screen, a light-emitting diode (LED) screen, an organic LED (OLED) screen, a movable display, a projection, etc. In some embodiments, the display 206 can include a coder/decoder, also known as Codecs, to convert digital media data into analog signals. For example, the visual peripheral output device can include video Codecs, audio Codecs, or any other suitable type of Codec.

The optional location device 211 may be communicatively coupled to a location network and operable to receive position data from the location network. For example, in some embodiments, the location device 211 includes a GPS device configured to receive position data identifying a latitude and longitude from one or more satellites of a GPS constellation. As another example, in some embodiments, the location device 211 is a cellular device configured to receive location data from one or more localized cellular towers. Based on the position data, the customer trust computing device 102 may determine a local geographical area (e.g., town, city, state, etc.) of its position.

In some embodiments, the customer trust computing device 102 is configured to implement one or more modules, sub-systems or engines, each of which is constructed, programmed, configured, or otherwise adapted, to autonomously carry out a function or set of functions. A module/engine can include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine can also be implemented as a combination of the two, with certain functions facilitated by hardware alone, and other functions facilitated by a combination of hardware and software. In certain implementations, at least a portion, and in some cases, all, of a module/engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine can be realized in a variety of physically realizable configurations, and should generally not be limited to any particular implementation exemplified herein, unless such limitations are expressly called out. In addition, a module/engine can itself be composed of more than one sub-modules or sub-engines, each of which can be regarded as a module/engine in its own right. Moreover, in the embodiments described herein, each of the various modules/engines corresponds to a defined autonomous functionality; however, it should be understood that in other contemplated embodiments, each functionality can be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the embodiments herein.

Figure 3:
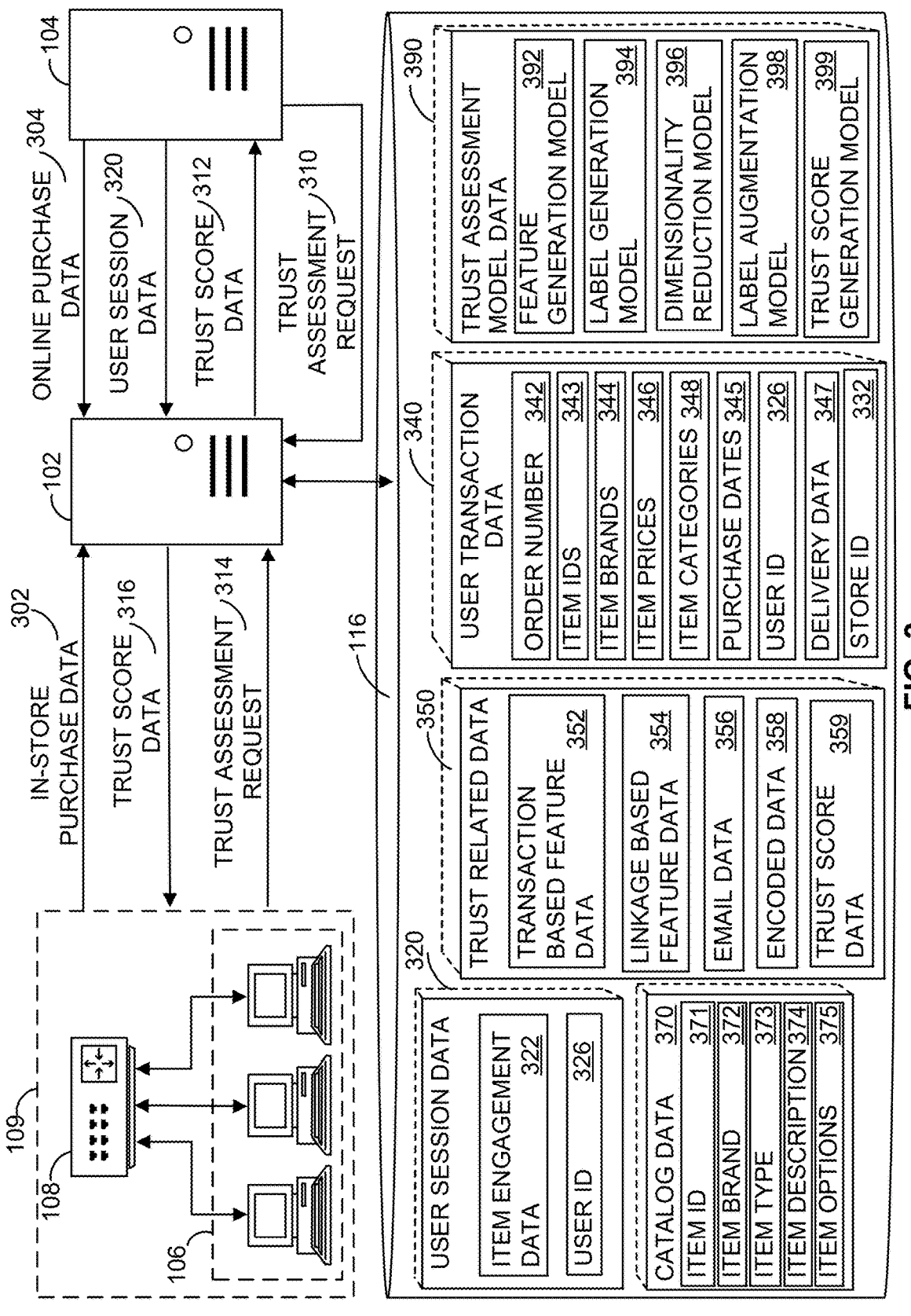
FIG. 3 is a block diagram illustrating various portions of a system for assessing trustworthiness of customer accounts using machine learning, in accordance with some embodiments of the present teaching.

FIG. 3 is a block diagram illustrating various portions of a system for assessing trustworthiness of customers using machine learning, e.g. the system shown in the network environment 100 of FIG. 1, in accordance with some embodiments of the present teaching. As indicated in FIG. 3, the customer trust computing device 102 may receive user session data 320 from the server 104, and store the user session data 320 in the database 116. The user session data 320 may identify, for each user (e.g., customer), data related to that user's browsing session, such as when browsing a retailer's webpage hosted by the server 104.

In some examples, the user session data 320 may include item engagement data 322, and user ID 326 (e.g., a customer ID, retailer website login ID, a cookie ID, etc.). The item engagement data 322 may include one or more of a session ID (i.e., a website browsing session identifier), items added-to-cart identifying items added to the user's online shopping cart. The customer trust computing device 102 may also receive online purchase or transaction data 304 from the server 104, which identifies and characterizes one or more online purchases, such as purchases made by the user and other users via a retailer's website hosted by the server 104. The customer trust computing device 102 may also receive in-store purchase or transaction data 302 from the store 109, which identifies and characterizes one or more in-store purchases, transactions, or customer activities. In some embodiments, the in-store purchase data 302 may also indicate other information about the store 109.

The customer trust computing device 102 may parse the in-store purchase data 302 and the online purchase data 304 to generate user transaction data 340. In this example, the user transaction data 340 may include, for each purchase, one or more of: an order number 342 identifying a purchase order, item IDs 343 identifying one or more items purchased in the purchase order, item brands 344 identifying a brand for each item purchased, item prices 346 identifying the price of each item purchased, item categories 348 identifying a product type (e.g., category) of each item purchased, purchase dates 345 identifying the purchase dates of the purchase orders, a user ID 326 for the user making the corresponding purchase, delivery data 347 indicating delivery information for corresponding online orders, and store ID 332 for the corresponding in-store purchase, or for the pickup store or shipping-from store associated with the corresponding online purchase.

In some embodiments, the database 116 may further hold trust related data 350, which may identify data related to trust assessment of customers of the stores 109 and e-commerce platforms (shopping website and/or shopping app) hosted by the server 104. The trust related data 350 may include, for each customer, transaction based numerical feature data 352 identifying numerical features based on the customer's transactions across various retail channels or systems (in-store, e-commerce, payment app, etc.), network or linkage based feature data 354 identifying payment methods and other entities linked to the customer or the transactions, and email data 356 highlighting email related features. The trust related data 350 may also include encoded data 358 identifying encoded features for training a customer trust score model to be used by the customer trust computing device 102 for computing customer trust scores, and trust score data 359 computed by the customer trust computing device 102 for customers.

In some embodiments, the database 116 may further store catalog data 370, which may identify one or more attributes of a plurality of items, such as a portion of or all items a retailer carries in stores and/or at e-commerce platforms. The catalog data 370 may identify, for each of the plurality of items, an item ID 371 (e.g., an SKU number), item brand 372, item type 373 (e.g., grocery item such as milk, clothing item), item description 374 (e.g., a description of the product including product features, such as ingredients, benefits, use or consumption instructions, or any other suitable description), and item options 375 (e.g., item colors, sizes, flavors, etc.).

The database 116 may also store user trust assessment model data 390 identifying and characterizing one or more models and related data for assessing trustworthiness of customer accounts. For example, the user trust assessment model data 390 may include a numerical feature generation model 392, a label generation model 394, a dimensionality reduction model 396, a label augmentation model 398, and a trust score generation model 399.

The feature generation model 392 may be used to generate numerical features or quantitative attributes related to customer accounts and transactions. These features may be used for trust assessment of a customer account based on a customer trust score model or training the customer trust score model. In some embodiments, the feature generation model 392 is used to generate sequential or temporal features and linkage-based features based on customers' interactions across various entities, retail channels, products and systems.

The label generation model 394 may be used to generate both transaction-level labels and customer-level labels. These labels can be utilized to form training data for training or building the customer trust score model. In some embodiments, the label generation model 394 includes rules-based logic to determine trust labels for different transactions performed on various retail channels and based on heuristics and/or domain knowledge and designed by experts in the field. In some embodiments, the label generation model 394 rolls up trust status from transaction level to customer level based on some rules and conditions, to determine trust labels for different customers at different points in time.

The dimensionality reduction model 396 may include an encoder to reduce dimensionality of the labelled numerical features for training the customer trust score model. In some embodiments, to minimize loss of information during the dimensionality reduction, the dimensionality reduction model 396 includes an artificial neural network comprising the encoder configured to compress data in original numerical features into a lower dimensional feature space, and a decoder configured to reconstruct the compressed features into the original feature space to generate reconstructed features with the same dimensionality as the original features. Hyperparameters of the neural network are found and optimized by minimizing a loss function on the original features and the reconstructed features to ensure minimal loss of information during the dimensionality reduction process.

The label augmentation model 398 may be used to augment some indeterminate labels to determinate labels (i.e. trusted labels or non-trusted labels). For many cold start problems involving new customers who do not have enough transaction history for directly assessing their trustworthiness, the new customer accounts may be labelled as indeterminate by the label generation model 394. In some embodiments, the label augmentation model 398 includes a clustering model for clustering the trusted customers and non-trusted customers into clusters or groups based on the quantitative features, and a label conversion model for converting labels of some indeterminate customers to either trusted customers or non-trusted customers. The clustering may be based on computing distances of a determinate data point (representing a trusted or non-trusted customer in the quantitative feature space) to every cluster and assigning the determinate data point to a cluster corresponding to a distance that is minimal among the distances and is smaller than a predetermined threshold. An indeterminate data point in the quantitative feature space is converted to be determinate when the indeterminate data point (representing the customer account initially labeled as indeterminate in the feature space) is closer to a determinate cluster based on a predetermined threshold. That is, if the indeterminate customer account is closer to a trusted cluster based on a threshold compared to any other cluster, then the indeterminate customer is assigned to the trusted cluster and converted to be a trusted customer; if the indeterminate customer is closer to a non-trusted cluster based on a threshold compared to any other cluster, the indeterminate customer is assigned to the non-trusted cluster and converted to be a non-trusted customer. In other words, at the end of label augmentation process, a portion of indeterminate group of customer accounts will be assigned to the trusted group, and another portion of indeterminate group of accounts will be assigned to the not-trusted group, based on their similarity and closeness to either trusted or not-trusted groups or clusters. Doing so, will reduce the volume of indeterminate group significantly.

The trust score generation model 399 may be used to generate trust scores for any given customer account. The trust score generation model 399 may be a machine learning model selected from a plurality of machine learning models that are trained based on quantitative features generated by the feature generation model 392, the data labels generated by the label generation model 394, and/or the augmented labels generated by the label augmentation model 398. In some embodiments, three trust scores are generated to represent likelihood or probabilities for a customer to be trusted, non-trusted and indeterminate, respectively. A trust status or trust category for the customer account can be determined to be trusted, non-trusted or indeterminate, based on these three trust scores.

In some examples, the customer trust computing device 102 receives a trust assessment request 310 from the server 104. The trust assessment request 310 may be associated with a customer of an e-commerce platform, e.g. a retailer's website or app, hosted by the server 104. In some examples, the trust assessment request 310 is to seek an assessment of trustworthiness of the customer account. The customer trust computing device 102 may generate at least one numerical feature or quantitative attribute associated with the customer based on historical transaction data (of both in-store and online transactions) of the customer. In some embodiments, the customer trust computing device 102 may obtain the at least one numerical feature from the server 104 and/or the database 116. Based on the at least one related numerical feature, the customer trust computing device 102 may compute, using at least one machine learning model, trust score data 312 of the customer account. The at least one machine learning model may include any model in the trust assessment model data 390. In response to the trust assessment request 310, the customer trust computing device 102 transmits the trust score data 312 of the customer to the server 104.

In some examples, the customer trust computing device 102 receives a trust assessment request 314 from the store 109. The trust assessment request 314 may be associated with a customer in the store 109 of a retailer. In some examples, the trust assessment request 314 is to seek an assessment of trustworthiness of the in-store customer account. The customer trust computing device 102 may generate at least one quantitative feature associated with the in-store customer based on historical transaction data (of both in-store and online transactions) of the customer. In some embodiments, the customer trust computing device 102 may obtain the at least one numerical feature from the server 104 and/or the database 116. Based on the at least one numerical feature, the customer trust computing device 102 may compute, using at least one machine learning model, trust score data 316 of the customer account. The at least one machine learning model may include any predictive multi-class classification model in the trust assessment model data 390. In response to the trust assessment request 314, the customer trust computing device 102 transmits the trust score data 316 of the customer to the server 104.

In some embodiments, the customer trust computing device 102 may assign one or more of the above described operations to a different processing unit or virtual machine hosted by one or more processing devices 120.

Figure 4:
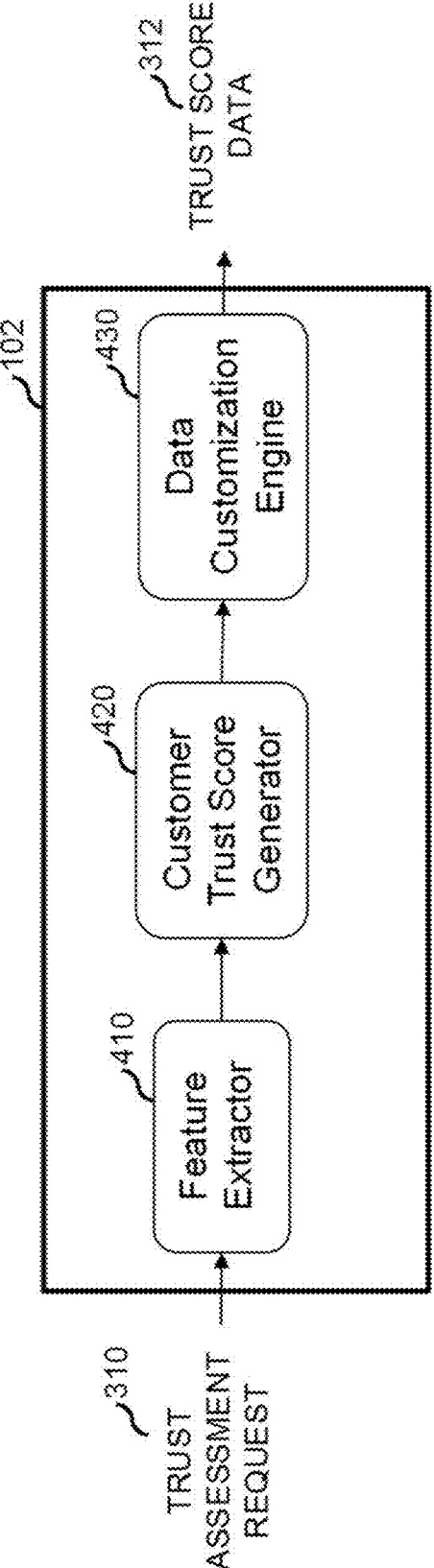
FIG. 4 illustrates a detailed diagram of a customer account trust computing device for computing trust score data or trustworthiness measures, in accordance with some embodiments of the present teaching.

FIG. 4 illustrates a detailed diagram of a customer trust computing device, e.g. the customer trust computing device 102 in FIG. 1 and/or FIG. 3, for computing trust score data. In the example shown in FIG. 4, the customer trust computing device 102 includes: a numerical feature extractor 410, a customer trust score generator 420, and an optional data customization engine 430.

In some embodiments, the feature extractor 410 receives a trust assessment request regarding a customer account, which may be the trust assessment request 310 as shown in FIG. 4 or the trust assessment request 314 as shown in FIG. 3. The numerical feature extractor 410 can extract one or more numerical features or quantitative attributes related to the customer account based on the trust assessment request 310. For example, the extracted numerical features may include a time-on-file of the customer's account, bank authorization signals, etc. The feature extractor 410 sends the extracted numerical features to the customer trust score generator 420 for customer trust score generation.

In some embodiments, the customer trust score generator 420 generates trust related scores for the customer using a customer trust score model based on the extracted numerical features. In some examples, the customer trust score generator 420 generates other related numerical features for the customer based on transactions of the customer across various retail channels and the customer's other interactions with various retail touchpoints, and inputs the extracted features into the customer trust score model for generating the trust related scores. In some examples, the numerical features include data related to: the customer accounts, entities associated with the customer account, retail channels interacted by the customer, bank authorization signals, payment risk factors of the customer, store and online return risk factors of the customer, shrinkage risk factors of the customer, and established purchases made by the customer across retail channels and systems. In some examples, the feature extractor 410 extracts these numerical features, e.g. from the database 116, and the extracted features sent to the customer trust score generator 420. In some embodiments, the customer trust score model is a machine learning model trained based on information in transactions and interactions of a plurality of customers on various retail touchpoints. In some embodiments, the trust related scores are generated by the customer trust score generator 420 in real-time after receiving the trust assessment request regarding the customer account, while the customer is trying to perform a transaction via a retail channel, e.g. in-store or online.

In some embodiments, the trust related scores generated by the customer trust score generator 420 include three scores: a trust score indicating a probability that the customer is a trusted customer, a non-trusted score indicating a probability that the customer is a non-trusted customer, and an indeterminate score indicating a probability that the customer is an indeterminate customer account. A trusted customer of a retailer refers to a customer with a substantial engagement period with the retailer, having a positive purchase transaction history and no instances of fraudulent or abusive behavior. A non-trusted customer of the retailer refers to a customer having either fraud chargebacks, risky store or online returns, store shrinkage risk, or any such negative behavior patterns based on interactions of the customer and/or related entities of the customer. An indeterminate customer of the retailer refers to a customer having not enough good or bad history with the retailer or its products.

In some examples, a summation of the three scores is always equal to one. The customer trust score generator 420 may also determine a trust status (as trusted, non-trusted or indeterminate) of the customer account based on the largest score among the three scores. For example, if the largest score is the trusted score, the trust status of the customer is determined to be trusted; if the largest score is the non-trusted score, the trust status of the customer is determined to be non-trusted; if the largest score is the indeterminate score, the trust status of the customer is determined to be indeterminate. The customer trust score generator 420 can send the trust scores and/or the trust status to the data customization engine 430.

The data customization engine 430 in this example is an optional component for post-processing and customizing data presentation. In some examples, the trust assessment request 310 seeks only the trust status of the customer. In some examples, the trust assessment request 310 seeks both the trust status and all trust related scores of the customer. In some examples, the trust assessment request 310 seeks the trust status and/or the trust related scores in a specific format or document type. The data customization engine 430 can meet all of these requirements accordingly to output the trust score data 312 (or the trust score data 316 as shown in FIG. 3) based on the data received from the customer trust score generator 420.

Figure 5:
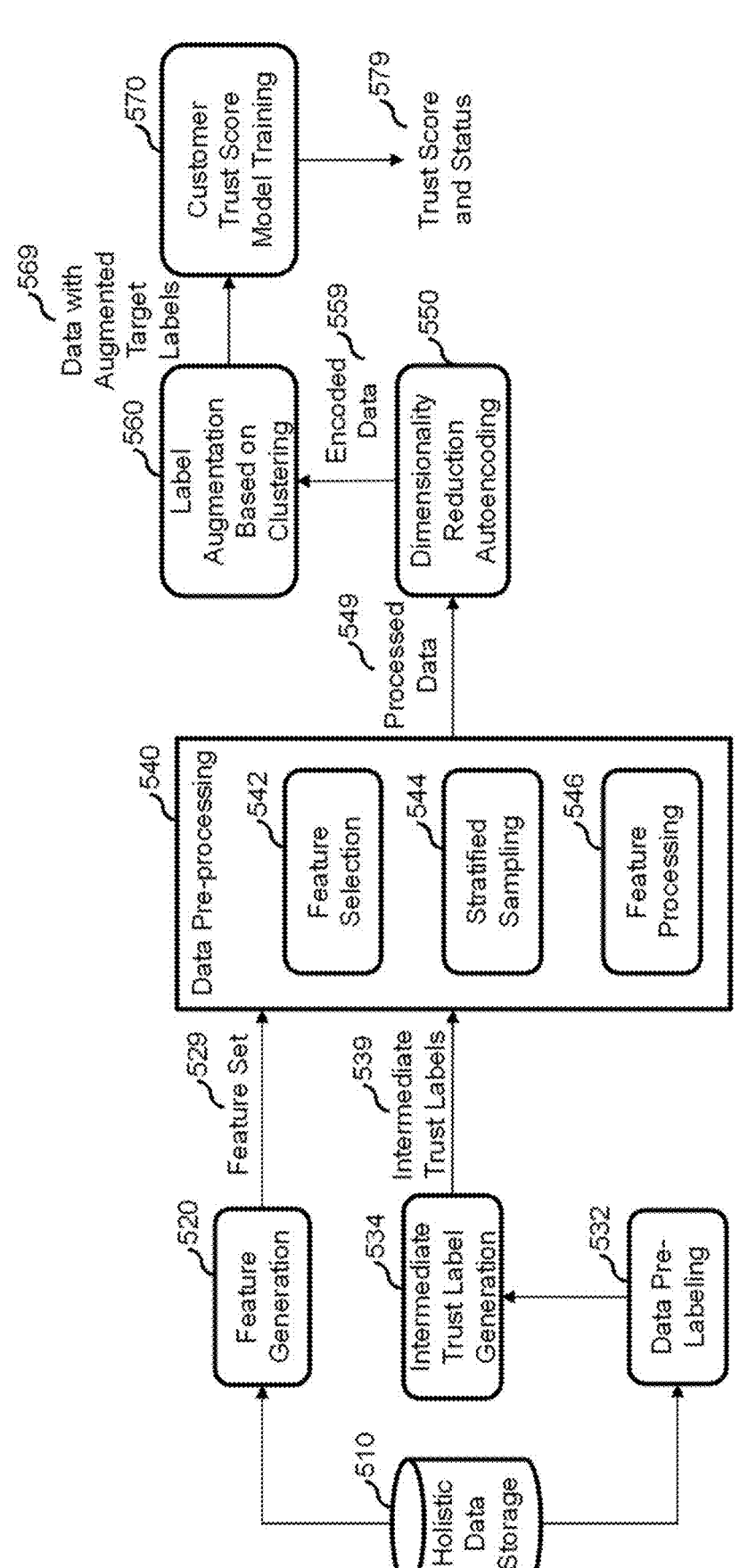
FIG. 5 illustrates a process for training or building a customer trust score model, in accordance with some embodiments of the present teaching.

FIG. 5 illustrates a process 500 for training a customer trust score model, e.g. the customer trust score model utilized by the customer trust score generator 420 in FIG. 4, in accordance with some embodiments of the present teaching. In some embodiments, the process 500 can be carried out by one or more computing devices, such as the server 104 and/or the customer trust computing device 102 of FIG.

1. For example, the process 500 can be performed by the customer trust computing device 102 periodically (e.g. daily, weekly, or monthly), or upon an update of the retailer's infrastructure (e.g. a new physical store, a new payment app, etc.).

Figure 6:
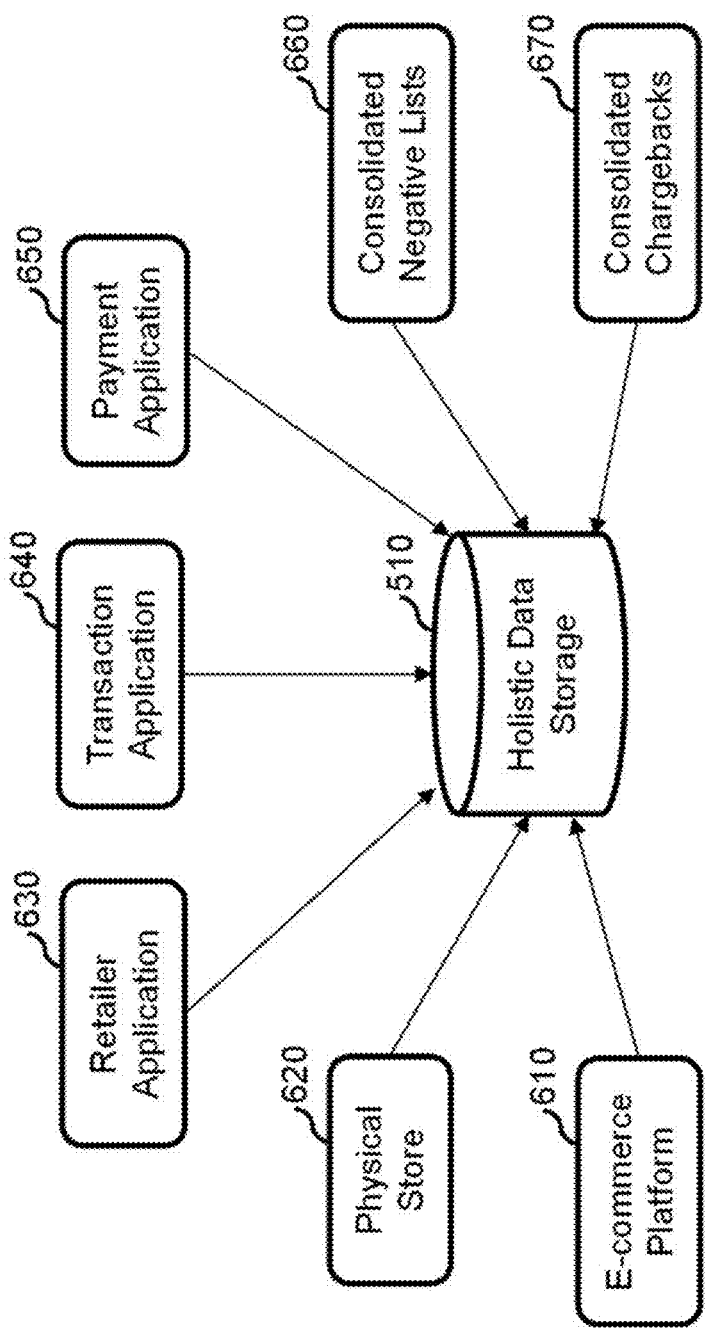
FIG. 6 illustrates exemplary data collected from various data sources for training or building a customer trust score model, in accordance with some embodiments of the present teaching.

As shown in FIG. 5, the process 500 starts from obtaining data from a holistic data storage 510, which may be a standalone database or part of the database 116. FIG. 6 illustrates exemplary data included in the holistic data storage 510, in accordance with some embodiments of the present teaching. As shown in FIG. 6, the holistic data storage 510 may include data collected from: e-commerce platforms 610, physical stores 620, retailer applications 630, transaction applications 640, payment applications 650, consolidated negative lists 660 and consolidated chargebacks 670. As such, the holistic data storage 510 can include: consolidated data of e-commerce and in-store transactions, data from abusive behavior and negative records, and fraud chargebacks.

Figure 7:
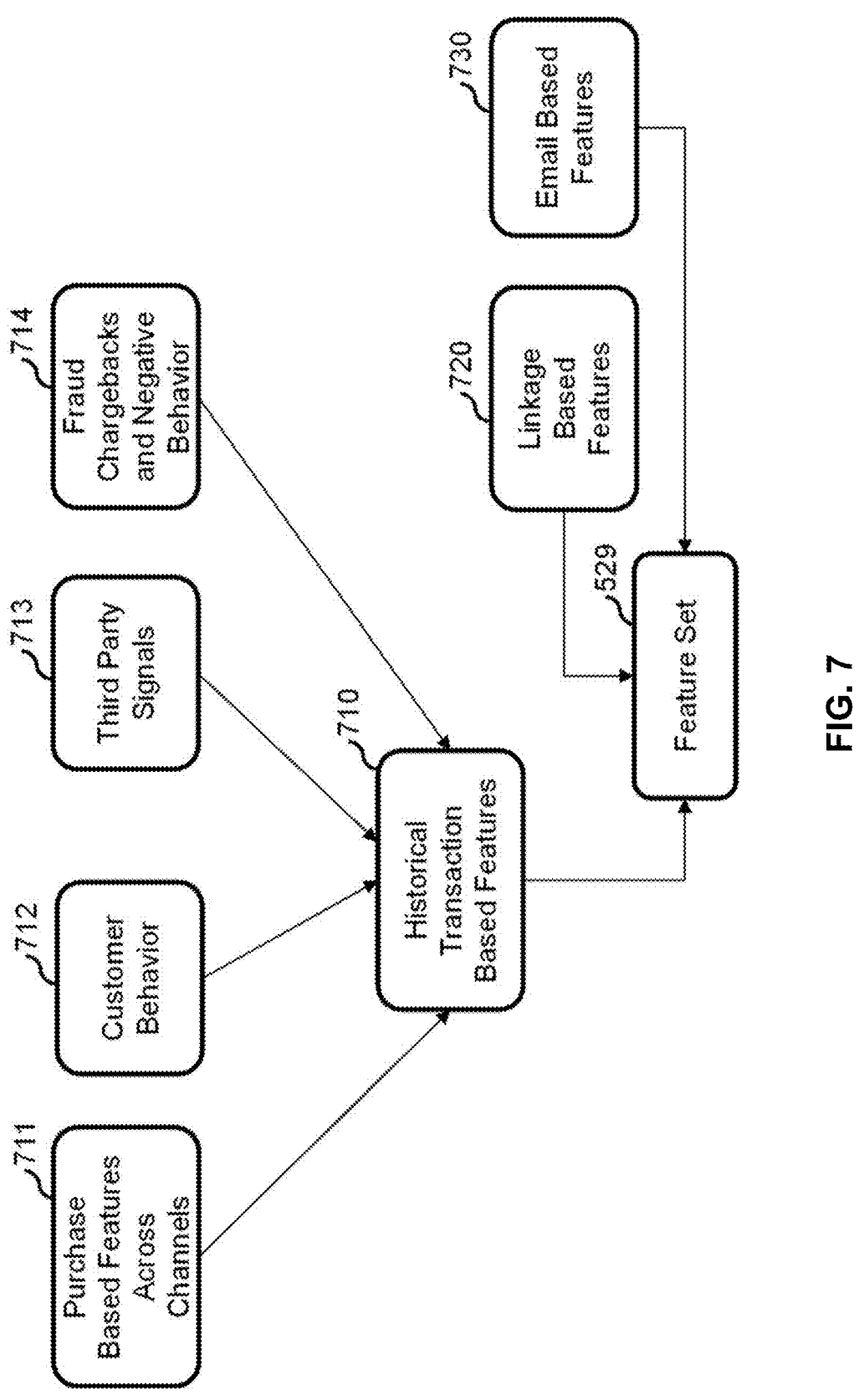
FIG. 7 illustrates exemplary numerical features or quantitative attributes used for training or building a customer trust score model, in accordance with some embodiments of the present teaching.

Referring back to FIG. 5, feature generation is performed at operation 520 to generate a numerical feature set 529 based on data in the holistic data storage 510. The feature set 529 includes numerical features or quantitative attributes to be used for training a customer trust score model. FIG. 7 illustrates exemplary features included in the feature set 529, in accordance with some embodiments of the present teaching. As shown in FIG. 7, the numerical feature set 529 may include: historical transaction based features 710, network or linkage based features 720, and email related features 730. The historical transaction based features 710 may include time series features of customers' transactions: e.g. purchase based features across various retail channels 711, customer behavior related features signals 712, third party signals 713 from various data sources collecting customer online or digital activity, and fraud chargebacks and negative behavior related features signals 714. The linkage-based features 720 may include network features of the customers or features quantifying connections with various entities that the customer is using related to transactions: e.g. a new payment method added by a customer, a quantity of new credit cards added to the customer's account in last n days. The email related features 730 may include customer contact emails and email risk features. As such, the feature set 529 includes transaction-based temporal and linkage-based features using the customer's interaction across various retail channels. In some examples, the feature set 529 has a large quantity of numerical features.

Referring back to FIG. 5, data pre-labeling is performed at operation 532 to generate transaction-level labels based on data from the holistic data storage 510. A transaction-level label indicates a corresponding transaction as: a trusted transaction, a non-trusted transaction, or an indeterminate transaction. Then intermediate trust label generation is performed at operation 534 to generate intermediate trust labels 539 at customer-level, based on the transaction-level labels generated at the operation 532. An intermediate trust label indicates a corresponding customer as: a trusted customer, a non-trusted customer, or an indeterminate customer. As shown in FIG. 5, the operations 532, 534 may be performed in parallel to the operation 520.

Figure 8:
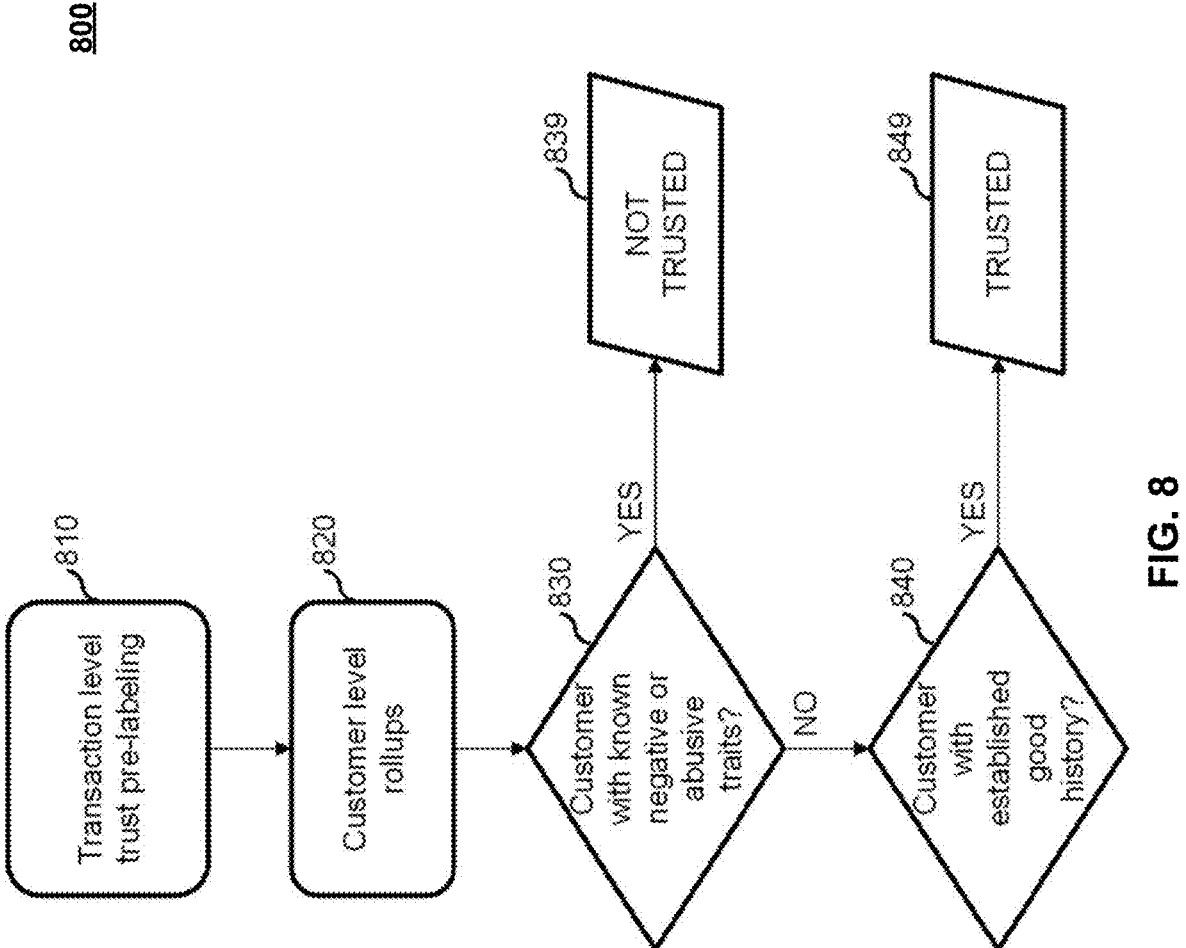
FIG. 8 illustrates a process for generating intermediate trust labels used for training or building a customer trust score model, in accordance with some embodiments of the present teaching.

FIG. 8 illustrates a process 800 for generating intermediate trust labels, in accordance with some embodiments of the present teaching. In some embodiments, the process 800 can be carried out by one or more computing devices, such as the server 104 and/or the customer trust computing device 102 of FIG. 1. For example, the process 800 can be performed by the customer trust computing device 102 in the operations 532, 534 as shown in FIG. 5.

Figure 9:
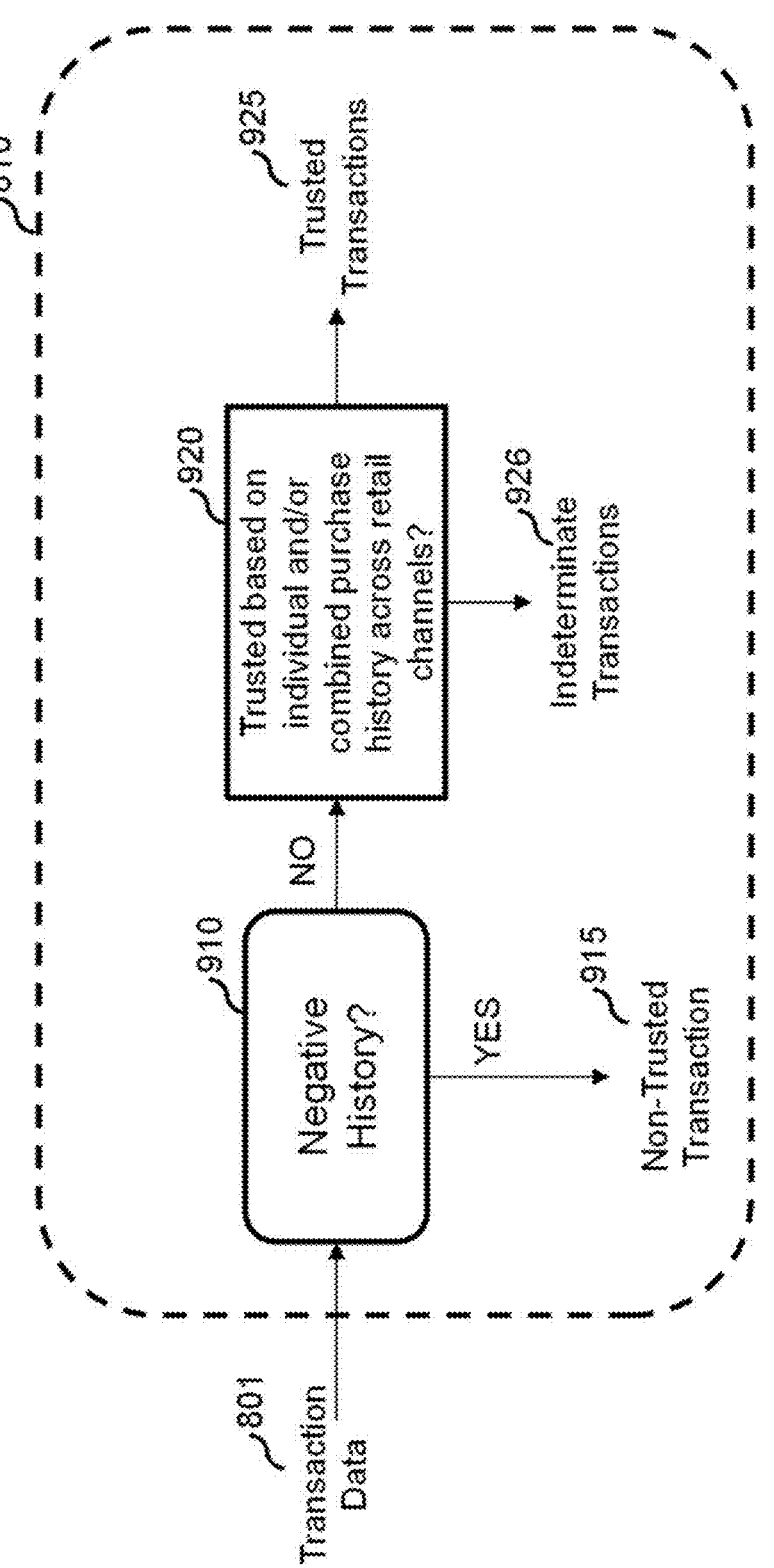
FIG. 9 illustrates a process for generating transaction-level trust labels, in accordance with some embodiments of the present teaching.

As shown in FIG. 8, the process 800 starts from operation 810, where transaction-level data pre-labeling is performed, e.g. using rule-based logic based on transaction data. In some embodiments, the transaction data may be obtained from the holistic data storage 510. FIG. 9 illustrates a detailed process of the operation 810, in accordance with some embodiments of the present teaching. As shown in FIG. 9, the operation 810 includes steps 910 and 920. At step 910, based on each transaction from the transaction dataset, it is determined whether the transaction is associated with a negative history, e.g. chargebacks or fraud loss, abusive or fraudulent behavior. The transaction may be associated with a negative history, in accordance with a determination that the transaction is performed by a customer having a negative history, by a related entity having a negative history, using a payment method or credit card having a negative history, etc. If it is determined at the step 910 that the transaction is associated with a negative history, the transaction is labelled as a non-trusted transaction 915. If it is determined at the step 910 that the transaction is not associated with any negative history, the process goes to step 920, where it is determined whether the transaction is associated with a customer or entity trusted based on individual and/or combined purchase history across retail channels, using some predetermined rules and thresholds. In some embodiments, the rules are derived from expert's opinion, domain knowledge and extensive data analysis across different retail channels or products, focusing on purchase patterns and considering positive versus negative history behaviors. In some examples, if the transaction is performed by a customer trusted in any retail channel, the transaction is labelled as a trusted transaction 925. In some examples, if the transaction is performed by a customer trusted in all channels when considered holistically or in combination, the transaction is labelled as a trusted transaction 925. On the other hand, if there is not enough good or bad history in the channels for the customer, the transaction is labelled as an indeterminate transaction 926.

Referring back to FIG. 8, at operation 820, the transaction level trust status or labels based on custom rules are rolled up to customer level, to determine whether each customer account should be labelled as trusted or non-trusted. At operation 830, it is determined whether a customer (or related entities) has known negative or abusive traits, e.g. chargebacks, abusive and fraudulent behaviors, that are not considered in previous steps. If so, the process goes to operation 839, to determine that the customer account is labelled as non-trusted. If not, the process goes to operation 840, where it is determined whether the customer has established good history, e.g. whether transactions of the customer during a past time period are trusted. If so, the process goes to operation 849, to determine that the customer account is labelled as trusted. In some embodiments, if it is determined that the customer does not have trusted transactions (only having indeterminate transactions) or does not have sufficient history at the operation 840, the customer account is labelled as indeterminate.

As such, according to the process 800, each customer is assigned a trust label, an intermediate customer-level trust label, based on purchase history and negative behaviors. In some embodiments, a customer-level trust label indicates a corresponding customer as a non-trusted customer in accordance with a determination that the corresponding customer or an entity associated with the corresponding customer has a negative behavior history within a certain time period, which includes: chargeback behavior, abusive behavior, or fraudulent behavior. In some embodiments, the customer-level trust label indicates the corresponding customer as a non-trusted customer in accordance with a determination that the corresponding customer has had a non-trusted transaction within a certain time period. In some embodiments, the customer-level trust label indicates the corresponding customer as a trusted customer in accordance with a determination that the corresponding customer has only trusted transactions within a certain time period. In some embodiments, the customer-level trust label indicates the corresponding customer as a trusted customer in accordance with a determination that the corresponding customer has no non-trusted transaction within a certain time period and a quantity of trusted transactions of the corresponding customer within a certain time period is larger than a predetermined threshold. In some embodiments, the customer-level trust label indicates the corresponding customer as an indeterminate customer in accordance with a determination that the corresponding customer has no non-trusted transaction within a certain time period and a quantity of transactions of the corresponding customer within a certain time period is smaller than or equal to the predetermined threshold.

Referring back to FIG. 5, data pre-processing is performed at operation 540 to process the numerical feature set 529 and the intermediate trust labels 539 to generate processed data 549. As shown in FIG. 5, the operation 540 includes a feature selection operation 542, a stratified sampling operation 544 and a feature processing operation 546.

Figure 10:
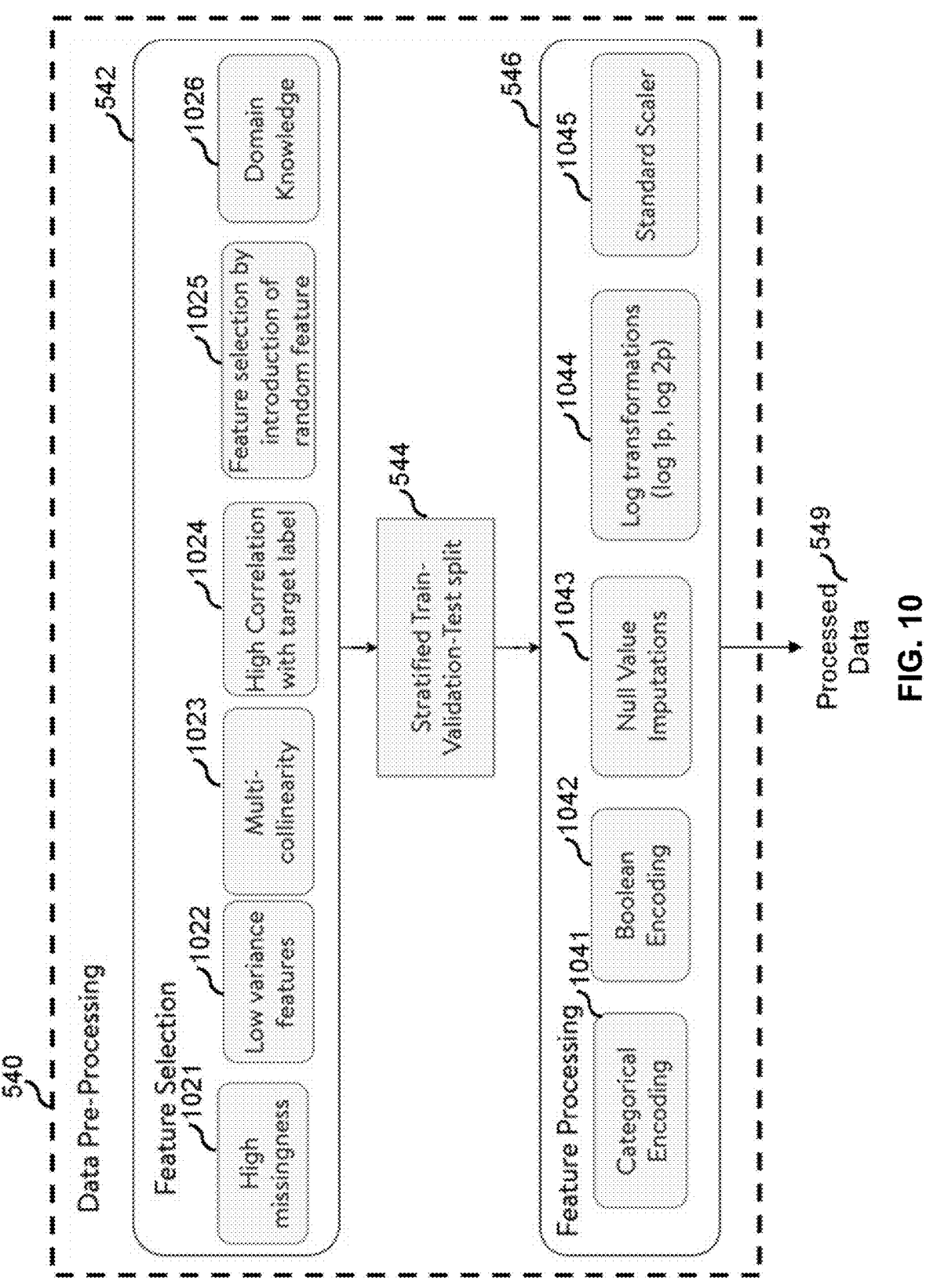
FIG. 10 illustrates a process for pre-processing and preparing data for training a customer trust score model, in accordance with some embodiments of the present teaching.

FIG. 10 illustrates a detailed process of the operation 540, in accordance with some embodiments of the present teaching. As shown in FIG. 10, the feature selection operation 542 utilizes various techniques and steps to identify important and non-sparse features for predictive modeling. The techniques and steps include but not limited to: dropping features with high missingness 1021, low variance features 1022, or with high multi-collinearity 1023, and selection of features with a high correlation with target label 1024, feature selection by introduction of random feature 1025, and use of domain knowledge 1026. After feature selection, intermediate trust labels 539 are used for stratified train-test-validation data split. For example, the stratified sampling operation 544 can sample and split labelled features into a training dataset, a validation dataset and a test dataset, for training and evaluating the customer trust score model. The feature processing operation 546 in this example implements various techniques to impute, standardize and prepare data for training the customer trust score model. For example, the various techniques include but not limited to: categorical encoding 1041, Boolean encoding 1042, null value imputations 1043, log transformation (log 1p, log 2p) 1044, and standard scaler 1045. In some embodiments, the processed data 549 generated by the operation 540 includes a smaller quantity of features compared to the feature set 529.

Figure 11:
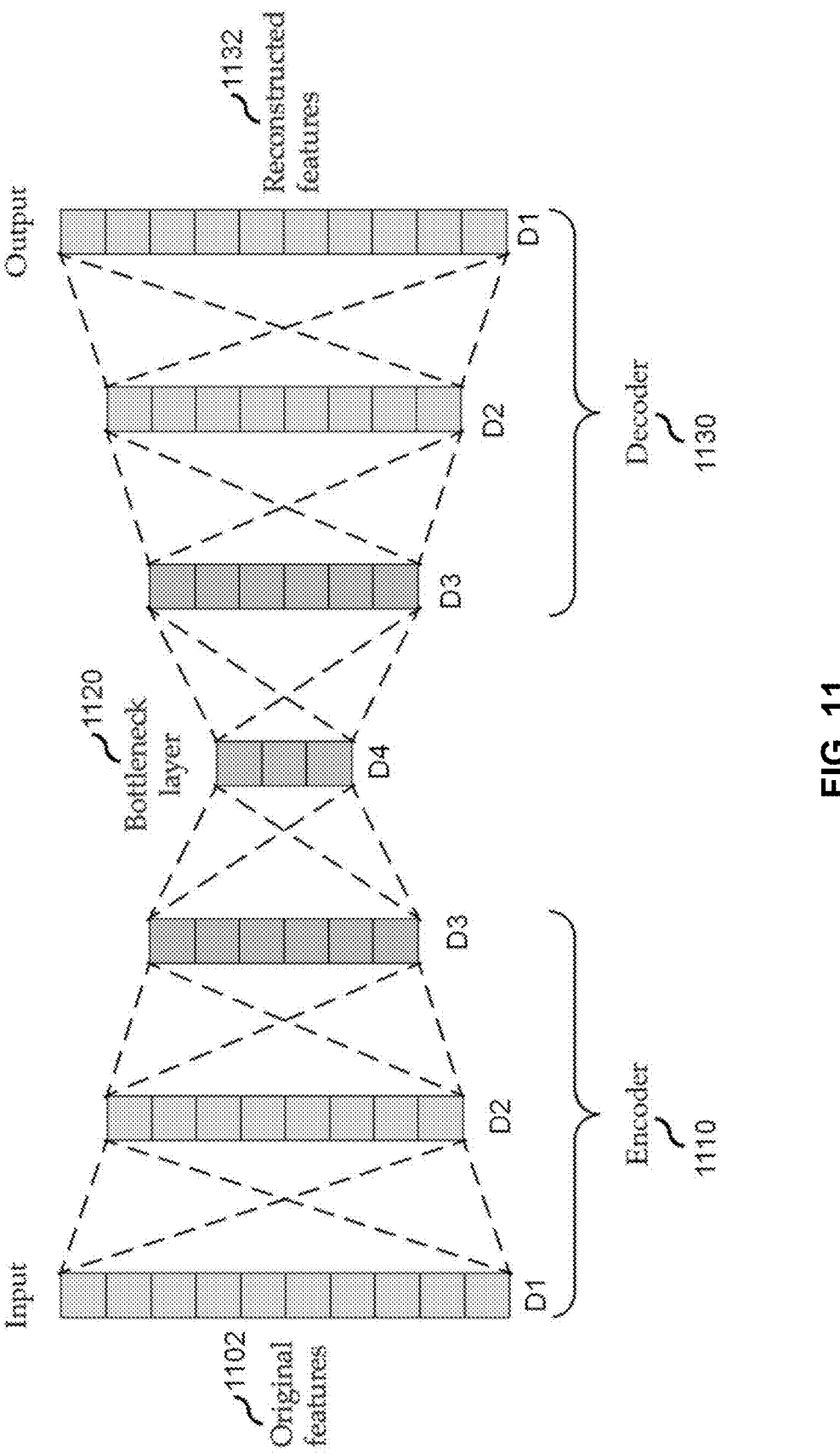
FIG. 11 illustrates an artificial neural network system for data dimensionality reduction, in accordance with some embodiments of the present teaching.

Referring back to FIG. 5, dimensionality reduction using autoencoders is performed at operation 550 to reduce the dimensionality of the processed data 549 and generate encoded data 559. In some embodiments, the dimensionality reduction is performed by an encoder of a neural network. FIG. 11 illustrates an example of a neural network 1100, which may be an artificial neural network including the encoder for data dimensionality reduction at the operation 550, in accordance with some embodiments of the present teaching. As shown in FIG. 11, the neural network 1100 includes an encoder 1110 and a decoder 1130. The encoder 1110 can compress original features 1102 input to the encoder 1110 from a dimensionality D1 to a dimensionality D4 at a bottleneck layer 1120 of the neural network 1100. As shown in FIG. 11, the feature dimensionality is reduced from D1 to D2, to D3, and to D4, smaller and smaller through layers of the encoder 1110 in this example.

In the example above, the original numerical features 1102 come from the processed data 549, and the output of the encoder 1110 is encoded data 559 with compressed features of the lower dimensionality D4. During a training stage of the neural network 1100, the decoder 1130 reconstructs the encoded features at the bottleneck layer 1120 to generate reconstructed features 1132 with the dimensionality D1. As shown in FIG. 11, the feature dimensionality is increased from D4 to D3, to D2, and to D1, larger and larger through layers of the decoder 1130 in this example. That is, the reconstructed features 1132 at the output of the decoder 1130 and the original features 1102 at the input of the encoder 1110 have a same data dimensionality of D1, which is higher than the data dimensionality D4 of the encoded features at the bottleneck layer 1120.

In some embodiments, the neural network 1100 has hyperparameters trained to minimize a loss function based on reconstructed features and the input features. In some examples, the loss function is expressed as:

$$L_{AE}(\theta, \phi) = \frac{1}{n}\sum_{i=1}^{n}\left(x^{(i)} - f_{\theta}\left(g_{\phi}\left(x^{(i)}\right)\right)\right)^2$$

where $g_{\phi}$ represents an encoder block, $f_{\theta}$ represents a decoder block, x represents input features, n represents the number of input features.

As such, the neural network 1100 can compress the original numerical features 1102 into a lower dimensional feature space with minimal loss of information. The compressed features enable a faster and efficient clustering for label augmentation later. In some embodiments, design choices and hyperparameters of the neural network 1100 include: number of hidden units, batch size, activation function, dropouts at each layer, batch normalizations and early stopping parameters. In some embodiments, the neural network 1100 has two hidden layers and the bottleneck layer 1120.

Figure 12:
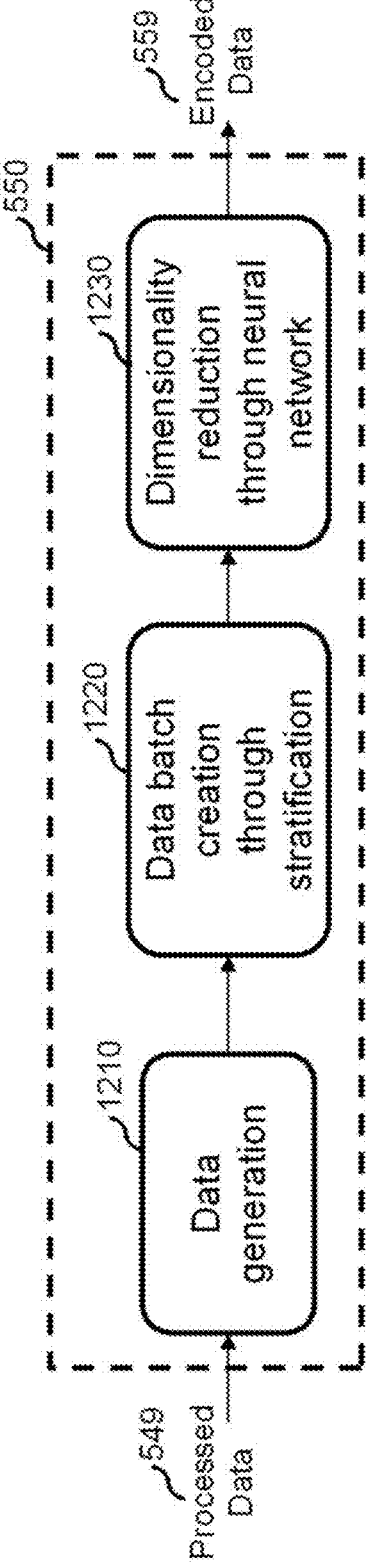
FIG. 12 illustrates a detailed process for data dimensionality reduction, in accordance with some embodiments of the present teaching.

FIG. 12 illustrates a detailed process of the operation 550 for data dimensionality reduction, in accordance with some embodiments of the present teaching. As shown in FIG. 12, the operation 550 in this example includes: an operation 1210 for data generation, an operation 1220 for data batch creation through stratification, and an operation 1230 for dimensionality reduction through neural network. At the operation 1210, a data generator may be used to read the relatively large processed data 549 in stratified batches for training the auto-encoder model (e.g. the neural network 1100) and optimizing the encoding process. At the operation 1220, stratification is employed on the read processed data including intermediate trust labels to generate a plurality of data batches. For example, when a training dataset in the processed data 549 has certain percentages of trusted samples, non-trusted samples, and indeterminate samples, each data batch is generated to have the same or very close percentages of trusted samples, non-trusted samples, and indeterminate samples. Based on the stratification, the auto-encoder model can more effectively comprehend the variability of distinct features. In some embodiments, this is achieved by offering sampling distribution that aligns with the real training data. At the operation 1230, the plurality of data batches is input into a neural network to generate the encoded data 559 with reduced data dimensionality. The auto-encoder model of the neural network can efficiently reduce the dimensionality of data from a high dimensionality to lower dimensions with minimal loss of information.

Figure 13:
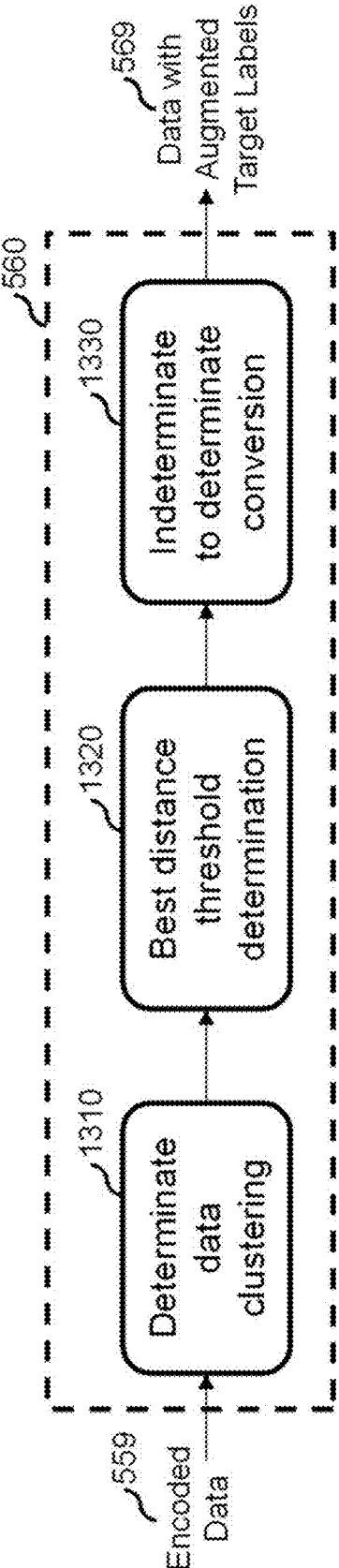
FIG. 13 illustrates a detailed process for data label augmentation, in accordance with some embodiments of the present teaching.

Referring back to FIG. 5, label augmentation based on clustering is performed at operation 560 to augment some indeterminate labels to determinate labels, i.e. converting some indeterminate customers to either trusted customers or non-trusted customers. FIG. 13 illustrates a detailed process of the operation 560 for data label augmentation, in accordance with some embodiments of the present teaching. As shown in FIG. 13, the operation 560 in this example includes: an operation 1310 for determinate data clustering, an operation 1320 for best distance threshold determination, and an operation 1330 for indeterminate to determinate conversion.

At operation 1310, indeterminate customers and determinate customers are identified from the plurality of customers based on the plurality of intermediate customer-level trust labels in the encoded data 559, and the determinate customers are clustered into a plurality of clusters. The determinate customers include trusted customers and non-trusted customers. Each cluster is indicated as a trusted cluster including trusted customers or a non-trusted cluster including non-trusted customers. In some embodiments, an optimal number of clusters (K) can be determined based on an elbow curve for K-means clustering.

In some embodiments, clustering the determinate customers comprises computing a minimum distance of determinate data points to every cluster center ($c_k$), and comparing the minimum distance to a distance threshold (E) for cluster assignment. For example, for each determinate customer among all determinate customers: the determinate customer is mapped to a corresponding first data point in a feature space based on encoded features of the determinate customer; a first distance is computed between the corresponding first data point and a center of each cluster of the plurality of clusters in the feature space to generate a plurality of first distances, wherein each cluster is initiated with one or more data points in the feature space; among the plurality of first distances, a first minimum distance is determined corresponding to a distance between the corresponding first data point and a center of a corresponding first cluster; and the determinate customer is assigned to the corresponding first cluster in accordance with a determination that the first minimum distance is smaller than a predetermined distance threshold, e.g. the distance threshold ($\in$), i.e. mind $(x, c_k)<\in$. That is, the distance threshold ($\in$) indicates a maximum distance for which a data point can be assigned to the closest cluster.

At operation 1320, the best or optimal distance threshold ($\in$) can be determined based on evaluating precision recall metrics and size of the final determinate population. In some embodiments, the distance threshold ($\in$) is optimized based on a tradeoff between: a maximization of a ratio of determinate customers to all customers and a maximization of an F1 score of the clustering process. The F1 score is a measure of the harmonic mean of precision rate and recall rate.

At operation 1330, the labels of indeterminate customers are augmented to be one of trusted, non-trusted or indeterminate. In some embodiments, due to the clustering of determinate customers at the operation 1310, at least some indeterminate customers are augmented to be trusted customers or non-trusted customers at the operation 1330. For example, at least one indeterminate customer among indeterminate customers is assigned to a trusted cluster or a non-trusted cluster. In some embodiments, the intermediate customer-level trust label of each respective indeterminate customer of the at least one indeterminate customer is converted to an augmented customer-level trust label, which indicates the respective indeterminate customer as a trusted customer in accordance with a determination that the respective indeterminate customer is assigned to a trusted cluster, and indicates the respective indeterminate customer as a non-trusted customer in accordance with a determination that the respective indeterminate customer is assigned to a non-trusted cluster.

In some examples, for each indeterminate customer of the indeterminate customers: the indeterminate customer is mapped to a corresponding second data point in the feature space based on encoded features of the indeterminate customer; a second distance is computed between the corresponding second data point and a center of each cluster of the plurality of clusters in the feature space to generate a plurality of second distances; among the plurality of second distances, a second minimum distance is determined corresponding to a distance between the corresponding second data point and a center of a corresponding second cluster; and the indeterminate customer is assigned to the corresponding second cluster in accordance with a determination that the second minimum distance is smaller than the predetermined distance threshold, e.g. the distance threshold ($\in$), i.e. min d(x,$c_k$)<$\in$. That is, the distance threshold ($\in$) also indicates a maximum distance till which an indeterminate data point can be assigned to the closest determinate cluster. As such, the output of the operation 560 includes data with augmented target labels 569. If an indeterminate customer is farther away from any cluster than the distance threshold ($\in$), the indeterminate customer remains as an indeterminate customer after label augmentation.

Figure 14:
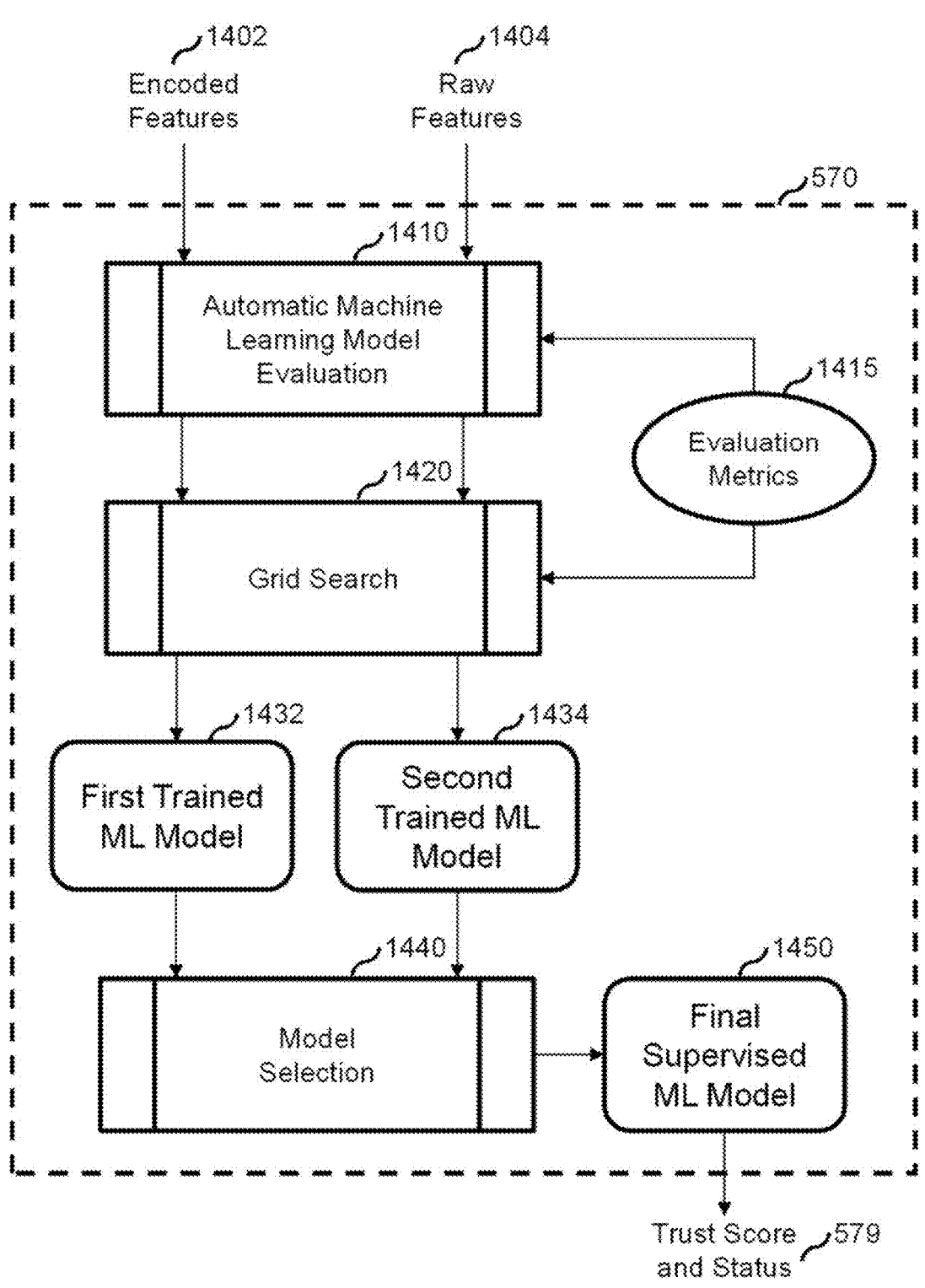
FIG. 14 illustrates a process for training and selecting or finding the best design and/or architecture for machine learning model for customer trust assessment, in accordance with some embodiments of the present teaching.

Referring back to FIG. 5, the data with augmented target labels 569 is used at operation 570 for training a customer trust score model, to generate trust score and trust status 579. FIG. 14 illustrates a detailed process of the operation 570 for training and selecting a best machine learning model as the customer trust score model, in accordance with some embodiments of the present teaching.

As shown in FIG. 14, the operation 570 includes: an operation 1410 of automatic machine learning model evaluation, an operation 1420 of grid search, and an operation 1440 of model selection. At the operation 1410, the system obtains two types of datasets having augmented labels for training at least one machine learning model: a dataset of the auto-encoded features 1402 with augmented labels, and another dataset of the original raw features 1404 with augmented labels. The auto-encoded features 1402 may be obtained from the encoded data 559 to form a first training dataset with augmented customer-level trust labels. The original raw features 1404 may be obtained from the feature set 529 or from processed data 549 to form a second training dataset with augmented customer-level trust labels.

In some embodiments, the first training dataset and the second training dataset are used separately through the operations 1410, 1420, for determining and selecting an optimal machine learning model.

In some examples, at the operation 1410, a first plurality of machine learning models is automatically trained based on the first training dataset, and automatically evaluated based on one or more evaluation metrics 1415. In some examples, the one or more evaluation metrics 1415 include: log-loss, weighted precision, weighted recall, weighted F1-score, and/or mean per class error. Based on the evaluation of the performances of the trained first plurality of machine learning models, a first machine learning model is determined among the first plurality of machine learning models. Then at the operation 1420, a grid search is performed to identify optimal hyperparameters for the first machine learning model, to generate a first trained machine learning model 1432. In some embodiments, the grid search is performed based on the one or more evaluation metrics 1415 to optimize and find the best hyperparameters.

In some examples, at the operation 1410, a second plurality of machine learning models are automatically trained based on the second training dataset, and automatically evaluated based on the one or more evaluation metrics 1415. In some examples, the one or more evaluation metrics 1415 include: log-loss, weighted precision, weighted recall, weighted F1-score, and/or mean per class error. Based on the evaluation of the performances of the trained second plurality of machine learning models, a second machine learning model is determined among the second plurality of machine learning models. Then at the operation 1420, a grid search is performed to identify optimal hyperparameters for the second machine learning model, to generate a second trained machine learning model 1434. In some embodiments, the grid search is performed based on the one or more evaluation metrics 1415 to optimize the hyperparameters.

At the operation 1440, an optimal machine learning model is selected from the first trained machine learning model 1432 and the second trained machine learning model 1434. The optimal machine learning model is used as a final supervised machine learning model 1450 for computing the trust score and trust status 579 during the training stage. The final supervised machine learning model 1450 will be used for computing the trust score data of the customer based on the at least one numerical feature, during the inference stage. In some embodiments, the optimal machine learning model is selected based on: performances of the first trained machine learning model 1432 and the second trained machine learning model 1434, response time for computing the trust score and trust status 579, and/or business requirements.

As such, the final supervised machine learning model 1450 is a multi-class classification model that can provide trust related scores, represented as likelihood or probability scores for a customer account belonging to trusted, non-trusted and indeterminate classes at a given time. The customer account can be assigned to one of three classes which has the highest probability score.

FIG. 15 is a flowchart illustrating an exemplary method 1500 for assessing or inferring trustworthiness of a customer account using the trained optimal machine learning model, in accordance with some embodiments of the present teaching. In some embodiments, the method 1500 can be carried out by one or more computing devices, such as the customer trust computing device 102 and/or the cloud-based engine 121 of FIG. 1. Beginning at operation 1502, a trust assessment request is received from a computing device. At operation 1504, at least one numerical feature or quantitative attribute associated with the customer is generated based on historical transaction data of the customer account and other relevant account-related activity and information. At operation 1506, trust score data of the customer account is computed using at least one machine learning model based on the at least one numerical feature. At operation 1508, the trust score data of the customer account is transmitted to the computing device in response to the trust assessment request.

Although the methods described above are with reference to the illustrated flowcharts, it will be appreciated that many other ways of performing the acts associated with the methods can be used. For example, the order of some operations may be changed, and some of the operations described may be optional.

The methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Each functional component described herein can be implemented in computer hardware, in program code, and/or in one or more computing systems executing such program code as is known in the art. As discussed above with respect to FIG. 2, such a computing system can include one or more processing units which execute processor-executable program code stored in a memory system. Similarly, each of the disclosed methods and other processes described herein can be executed using any suitable combination of hardware and software. Software program code embodying these processes can be stored by any non-transitory tangible medium, as discussed above with respect to FIG. 2.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although the subject matter has been described in terms of exemplary embodiments, it is not limited thereto. Rather, the appended claims should be construed broadly, to include other variants and embodiments, which can be made by those skilled in the art.

What is claimed is:

1. A system, comprising:
   at least one processor; and
   a non-transitory memory having instructions stored thereon, wherein the instructions, when executed, cause the at least one processor
   to
      receive, from a database, original features comprising transactions labelled with a trust level;
      input the original features to an encoder of at least one machine learning model to generate encoded features at a bottleneck layer of the at least one machine learning model, wherein the encoder compresses the original features from a first dimensionality to at least a second dimensionality to generate the encoded features, and wherein the second dimensionality is less than the first dimensionality;

input the encoded features to a decoder of the machine learning model to generate reconstructed features, wherein parameters of the machine learning model are adjusted based on a loss between the reconstructed features and the original features;

receive, from a computing device over a network, a trust assessment request regarding a transaction for a customer;

in response to the trust assessment request, receive, from the database, historical transaction data and relevant account information of the customer;

generate at least one trust-related feature associated with the customer based on the historical transaction data and the relevant account information of the customer, wherein the at least one trust-related feature comprises a first feature labelled as trusted and a second feature labelled as non-trusted;

execute the at least one machine learning model and generate trust score data of the customer based on the at least one trust-related feature, wherein the trust score data characterizes a probability that the customer is trustworthy; and transmit, in response to the trust assessment request and over the network, the trust score data of the customer to the computing device to process the transaction in accordance with the trust score data.

2. The system of claim 1, wherein:

the historical transaction data of the customer includes data of transactions across a plurality of retail channels and e-commerce systems; and the plurality of retail channels includes at least: an e-commerce platform, a physical store, a retailer's application, a transaction application, and a payment application.

3. The system of claim 2, wherein the at least one trust-related feature comprises:

historical transaction based features related to: purchases made by the customer across the plurality of retail channels, account data, bank account verification data associated with the customer, third party risk signals associated with the customer, abuse or fraud chargeback data associated with the customer;

linkage based features related to: a newly added payment method, a quantity of payment methods used during a past time period, quantities of entities and identifiers related to the historical transaction data; and email related features related to: a determination whether the customer is associated with a risky email.

4. The system of claim 1, wherein the trust score data comprises a plurality of scores including:

a first score indicating a likelihood or probability that the customer is trustworthy;

a second score indicating a probability that the customer account is not trustworthy; and a third score indicating a probability that a trustworthiness of the customer is indeterminate.

5. The system of claim 4, wherein the at least one processor is further configured to read the instructions to:

determine an account trust status of the customer based on the plurality of scores and at least one predetermined threshold, wherein the trust status indicates the customer as: trusted, non-trusted, or indeterminate; and transmit the trust status of the customer to the computing device.

6. The system of claim 1, wherein the at least one machine learning model is trained based on:

obtaining transaction data related to a plurality of account data and transactions performed by a plurality of customers via a plurality of retail channels;

generating trust-related feature data based on the transaction data and account data;

generating a plurality of transaction-level trust labels each corresponding to a respective transaction of the plurality of transactions based on at least one logic rule, wherein each transaction-level trust label indicates the respective transaction as: a trusted transaction, a non-trusted transaction, or an indeterminate transaction;

generating labelled training data based on the plurality of transaction-level trust labels and the trust-related feature data; and training the at least one machine learning model based on the labelled training data.

7. The system of claim 6, wherein generating the labelled training data comprises:

generating a plurality of intermediate customer-level trust labels each corresponding to a respective customer of the plurality of customers, wherein a customer-level trust label indicates a corresponding customer as non-trusted customer, trusted customer or intermediate customer, based on transaction history of the corresponding customer and the plurality of transaction-level trust labels; and generating the labelled training data based on the plurality of intermediate customer-level trust labels and the trust-related feature data.

8. The system of claim 7, wherein generating the labelled training data further comprises:

processing the plurality of intermediate customer-level trust labels and the trust-related feature data to generate processed data;

employing stratification on the processed data to generate a plurality of data batches;

inputting the plurality of data batches to an artificial neural network to generate encoded data with reduced data dimensionality, wherein:

the artificial neural network includes an encoder and a decoder, the encoder compresses input features of the artificial neural network to generate encoded features, the decoder reconstructs the encoded features to generate reconstructed features, the reconstructed features and the input features have a same data dimensionality that is higher than a data dimensionality of the encoded features, the artificial neural network has hyperparameters trained to minimize a loss function of the reconstructed features and the input features.

9. The system of claim 8, wherein generating the labelled training data further comprises:

identifying, from the plurality of customers, indeterminate customers and determinate customers including trusted customers and non-trusted customers, based on the plurality of intermediate customer-level trust labels in the encoded data;

clustering the determinate customers into a plurality of clusters, each of which is indicated as a trusted cluster including trusted customers or a non-trusted cluster including non-trusted customers;

assigning at least one indeterminate customer of the indeterminate customers to a trusted cluster or a non-trusted cluster;

converting the intermediate customer-level trust label of each respective indeterminate customer of the at least one indeterminate customer to an augmented customer-level trust label, which indicates the respective indeterminate customer as a trusted customer in accordance with a determination that the respective indeterminate customer is assigned to a trusted cluster and indicates the respective indeterminate customer as a non-trusted customer in accordance with a determination that the respective indeterminate customer is assigned to a non-trusted cluster; and generating the labelled training data based on the plurality of intermediate customer-level trust labels, the augmented customer-level trust label, and the trust-related feature data.

10. The system of claim 9, wherein clustering the determinate customers comprises:

for each determinate customer of the determinate customers:

mapping the determinate customer to a corresponding first data point in a feature space based on trust-related features of the determinate customer;

computing a first distance between the corresponding first data point and a center of each cluster of the plurality of clusters in the feature space to generate a plurality of first distances, wherein each cluster is initiated with one or more data points in the feature space;

determining, among the plurality of first distances, a first minimum distance corresponding to a distance between the corresponding first data point and a center of a corresponding first cluster; and assigning the determinate customer to the corresponding first cluster in accordance with a determination that the first minimum distance is smaller than a predetermined distance threshold.

11. The system of claim 10, wherein assigning the at least one indeterminate customer comprises:

for each indeterminate customer of the indeterminate customers:

mapping the indeterminate customer to a corresponding second data point in the feature space based on trust-related features of the indeterminate customer;

computing a second distance between the corresponding second data point and a center of each cluster of the plurality of clusters in the feature space to generate a plurality of second distances;

determining, among the plurality of second distances, a second minimum distance corresponding to a distance between the corresponding second data point and a center of a corresponding second cluster; and assigning the indeterminate customer to the corresponding second cluster in accordance with a determination that the second minimum distance is smaller than the predetermined distance threshold.

12. The system of claim 11, wherein the predetermined distance threshold is determined based on a tradeoff between: a maximization of a ratio of determinate customers in all customers and a maximization of an F1 score of the clustering.

13. The system of claim 9, wherein training the at least one machine learning model comprises:

generating a first training dataset including encoded features in the encoded data with intermediate and augmented customer-level trust labels;

training a first plurality of machine learning models based on the first training dataset;

determining, among the first plurality of machine learning models, a first machine learning model based on performances of the first plurality of machine learning models and at least one evaluation metric;

re-training the first machine learning model to identify optimal hyperparameters for the first machine learning model;

generating a second training dataset including raw features in the trust-related feature data with intermediate and augmented customer-level trust labels;

training a second plurality of machine learning models based on the second training dataset;

determining, among the second plurality of machine learning models, a second machine learning model based on performances of the second plurality of machine learning models and at least one evaluation metric;

re-training machine learning model to identify optimal hyperparameters for the second machine learning model; and selecting, from the re-trained first machine learning model and the re-trained second machine learning model, an optimal machine learning model for computing the trust score data of the customer based on the at least one trust-related feature, wherein the optimal machine learning model is selected based on: performances of the two re-trained machine learning models, response time for computing the trust score data, and business requirement.

14. A computer-implemented method, comprising:

receiving, from a database, original features comprising transactions labelled with a trust level;

inputting the original features to an encoder of at least one machine learning model to generate encoded features at a bottleneck layer of the at least one machine learning model, wherein the encoder compresses the original features from a first dimensionality to at least a second dimensionality to generate the encoded features, and wherein the second dimensionality is less than the first dimensionality;

inputting the encoded features to a decoder of the machine learning model to generate reconstructed features, wherein parameters of the machine learning model are adjusted based on a loss between the reconstructed features and the original features;

receiving, from a computing device over a network, a trust assessment request regarding a transaction for a customer;

in response to the trust assessment request, receiving, from the database, historical transaction data and relevant account information of the customer;

generating at least one trust-related feature associated with the customer based on the historical transaction data and the relevant account information of the customer, wherein the at least one trust-related feature comprises a first feature labelled as trusted and a second feature labelled as non-trusted;

execute the at least one machine learning model and generate trust score data of the customer based on the at least one trust-related feature, wherein the trust score data characterizes a probability that the customer is trustworthy; and transmitting, in response to the trust assessment request and over the network, the trust score data of the customer to the computing device to process the transaction in accordance with the trust score data.

15. The computer-implemented method of claim 14, wherein the at least one machine learning model is trained based on:

obtaining transaction data related to a plurality of account data and transactions performed by a plurality of customers via a plurality of retail channels;

generating trust-related feature data based on the transaction data and account data;

generating a plurality of transaction-level trust labels each corresponding to a respective transaction of the plurality of transactions based on at least one logic rule, wherein each transaction-level trust label indicates the respective transaction as: a trusted transaction, a non-trusted transaction, or an indeterminate transaction;

generating labelled training data based on the plurality of transaction-level trust labels and the trust-related feature data; and training the at least one machine learning model based on the labelled training data.

16. The computer-implemented method of claim 15, wherein generating the labelled training data comprises:

generating a plurality of intermediate customer-level trust labels each corresponding to a respective customer of the plurality of customers, wherein a customer-level trust label indicates a corresponding customer as non-trusted customer, trusted customer or intermediate customer, based on transaction history of the corresponding customer and the plurality of transaction-level trust labels; and generating the labelled training data based on the plurality of intermediate customer-level trust labels and the trust-related feature data.

17. The computer-implemented method of claim 16, wherein generating the labelled training data further comprises:

processing the plurality of intermediate customer-level trust labels and the trust-related feature data to generate processed data;

employing stratification on the processed data to generate a plurality of data batches;

inputting the plurality of data batches to an artificial neural network to generate encoded data with reduced data dimensionality, wherein:

the artificial neural network includes an encoder and a decoder, the encoder compresses input features of the artificial neural network to generate encoded features, the decoder reconstructs the encoded features to generate reconstructed features, the reconstructed features and the input features have a same data dimensionality that is higher than a data dimensionality of the encoded features, the artificial neural network has hyperparameters trained to minimize a loss function of the reconstructed features and the input features.

18. The computer-implemented method of claim 17, wherein generating the labelled training data further comprises:

identifying, from the plurality of customers, indeterminate customers and determinate customers including trusted customers and non-trusted customers, based on the plurality of intermediate customer-level trust labels in the encoded data;

clustering the determinate customers into a plurality of clusters, each of which is indicated as a trusted cluster including trusted customers or a non-trusted cluster including non-trusted customers;

assigning at least one indeterminate customer of the indeterminate customers to a trusted cluster or a non-trusted cluster;

converting the intermediate customer-level trust label of each respective indeterminate customer of the at least one indeterminate customer to an augmented customer-level trust label, which indicates the respective indeterminate customer as a trusted customer in accordance with a determination that the respective indeterminate customer is assigned to a trusted cluster and indicates the respective indeterminate customer as a non-trusted customer in accordance with a determination that the respective indeterminate customer is assigned to a non-trusted cluster; and generating the labelled training data based on the plurality of intermediate customer-level trust labels, the augmented customer-level trust label, and the trust-related feature data.

19. The computer-implemented method of claim 18, wherein training the at least one machine learning model comprises:

generating a first training dataset including encoded features in the encoded data with intermediate and augmented customer-level trust labels;

training a first plurality of machine learning models based on the first training dataset;

determining, among the first plurality of machine learning models, a first machine learning model based on performances of the first plurality of machine learning models and at least one evaluation metric;

re-training the first machine learning model to identify optimal hyperparameters for the first machine learning model;

generating a second training dataset including raw features in the trust-related feature data with intermediate and augmented customer-level trust labels;

training a second plurality of machine learning models based on the second training dataset;

determining, among the second plurality of machine learning models, a second machine learning model based on performances of the second plurality of machine learning models and at least one evaluation metric;

re-training the second machine learning model to identify optimal hyperparameters for the second machine learning model; and selecting, from the re-trained first machine learning model and the re-trained second machine learning model, an optimal machine learning model for computing the trust score data of the customer based on the at least one trust-related feature, wherein the optimal machine learning model is selected based on: performances of the two re-trained machine learning models, response time for computing the trust score data, and business requirement.

20. A non-transitory computer readable medium having instructions stored thereon, wherein the instructions, when executed by at least one processor, cause at least one device to perform operations comprising:

receiving, from a database, original features comprising transactions labelled with a trust level;

inputting the original features to an encoder of at least one machine learning model to generate encoded features at a bottleneck layer of the at least one machine learning model, wherein the encoder compresses the original features from a first dimensionality to at least a second dimensionality to generate the encoded features, and wherein the second dimensionality is less than the first dimensionality;

inputting the encoded features to a decoder of the machine learning model to generate reconstructed features, wherein parameters of the machine learning model are adjusted based on a loss between the reconstructed features and the original features;

receiving, from a computing device over a network, a trust assessment request regarding a transaction for a customer;

in response to the trust assessment request, receiving, from the database, historical transaction data and relevant account information of the customer;

generating at least one trust-related feature associated with the customer based on the historical transaction data and the relevant account information of the customer, wherein the at least one trust-related feature comprises a first feature labelled as trusted and a second feature labelled as non-trusted;

execute the at least one machine learning model and generate trust score data of the customer based on the at least one trust-related feature, wherein the trust score data characterizes a probability that the customer is trustworthy; and transmitting, in response to the trust assessment request and over the network, the trust score data of the customer to the computing device to process the transaction in accordance with the trust score data.

\* \* \* \* \*